(12) United States Patent
Ohmori et al.

(10) Patent No.: US 7,739,145 B2
(45) Date of Patent: Jun. 15, 2010

(54) SALES SYSTEM AND RECORDING MEDIUM

(75) Inventors: Motoji Ohmori, Hirakata (JP); Yoshiaki Iwata, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1326 days.

(21) Appl. No.: 10/537,549

(22) PCT Filed: Feb. 17, 2004

(86) PCT No.: PCT/JP2004/001741

§ 371 (c)(1),
(2), (4) Date: Jun. 3, 2005

(87) PCT Pub. No.: WO2004/075082

PCT Pub. Date: Sep. 2, 2004

(65) Prior Publication Data

US 2006/0100932 A1    May 11, 2006

(30) Foreign Application Priority Data

Feb. 18, 2003    (JP)    ............... 2003-040354

(51) Int. Cl.
*G06Q 20/00*    (2006.01)
*G06Q 30/00*    (2006.01)

(52) U.S. Cl. ............... 705/16; 705/14.38; 705/17; 705/21

(58) Field of Classification Search ............... None
See application file for complete search history.

(56) References Cited

U.S. PATENT DOCUMENTS

| 5,806,045 | A  | * | 9/1998 | Biorge et al. ............... 705/14.17 |
| 6,282,516 | B1 | * | 8/2001 | Giuliani ............... 705/14.25 |
| 7,093,754 | B2 | * | 8/2006 | Sako ............... 235/385 |
| 2002/0059298 | A1 |   | 5/2002 | Kamata |
| 2003/0078844 | A1 | * | 4/2003 | Takatori et al. ............... 705/17 |
| 2003/0233279 | A1 | * | 12/2003 | Shinzaki ............... 705/21 |
| 2004/0117301 | A1 | * | 6/2004 | Fujisawa et al. ............... 705/39 |
| 2005/0038705 | A1 | * | 2/2005 | Yamada ............... 705/16 |

FOREIGN PATENT DOCUMENTS

| JP | 3-67395 | 3/1991 |
| JP | 2000-132746 | 5/2000 |
| JP | 2001-250168 | 9/2001 |
| JP | 2002-24484 | 1/2002 |
| JP | 2002-109645 | 4/2002 |
| JP | 2002-183840 | 6/2002 |
| JP | 2002-334254 | 11/2002 |

* cited by examiner

*Primary Examiner*—F. Ryan Zeender
*Assistant Examiner*—Faris Almatrahi
(74) *Attorney, Agent, or Firm*—Wenderoth, Lind & Ponack, L.L.P.

(57) ABSTRACT

An embodiment of the present invention is directed to a sales system including a recording medium for use in purchasing a commodity, and a register apparatus for performing processing for settlement of payment for purchase of the commodity. Another embodiment of the present invention is directed to a sales system including a mobile information terminal for use in purchasing a commodity, and a register apparatus for performing processing for settlement of payment for purchase of the commodity.

6 Claims, 22 Drawing Sheets

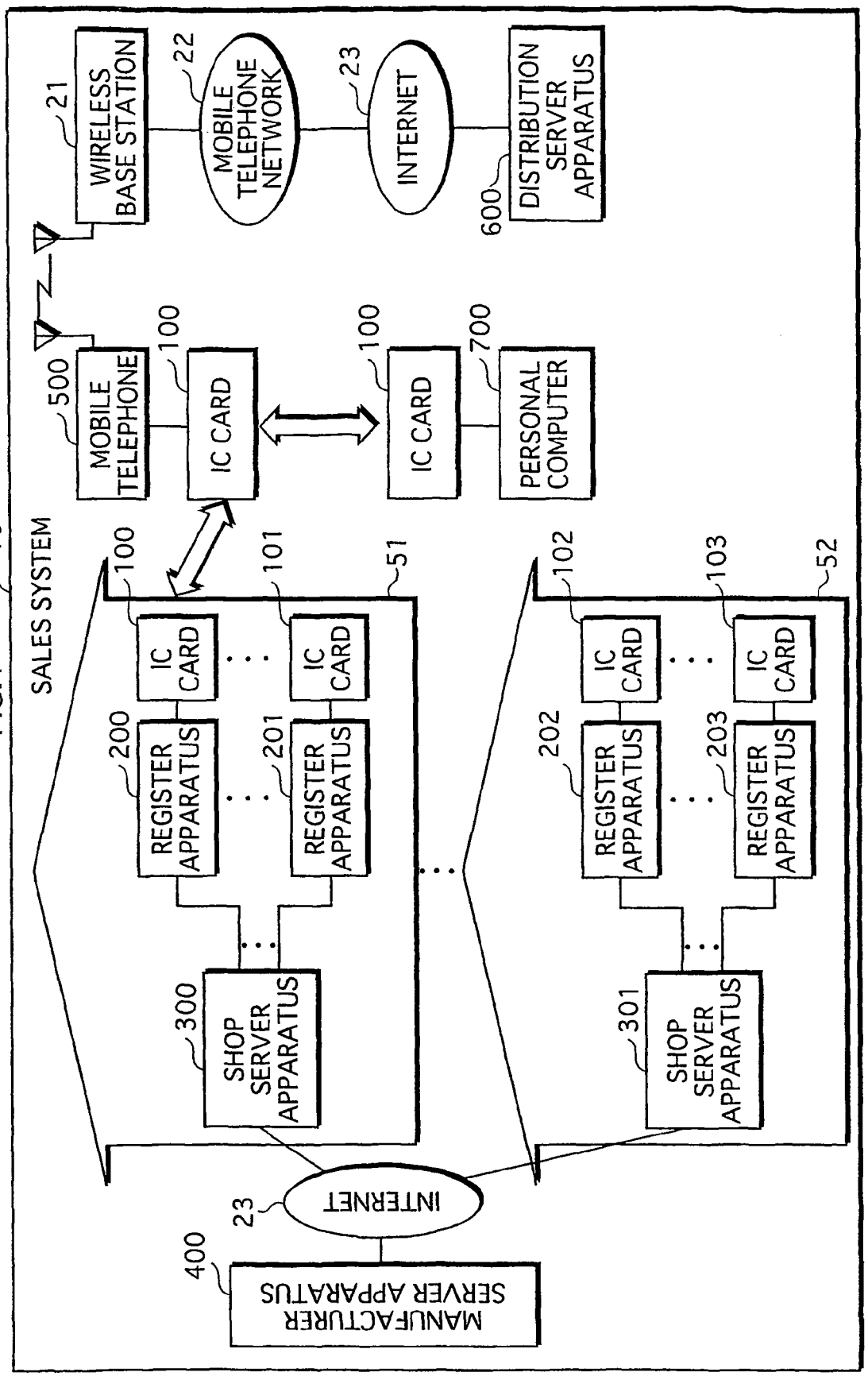

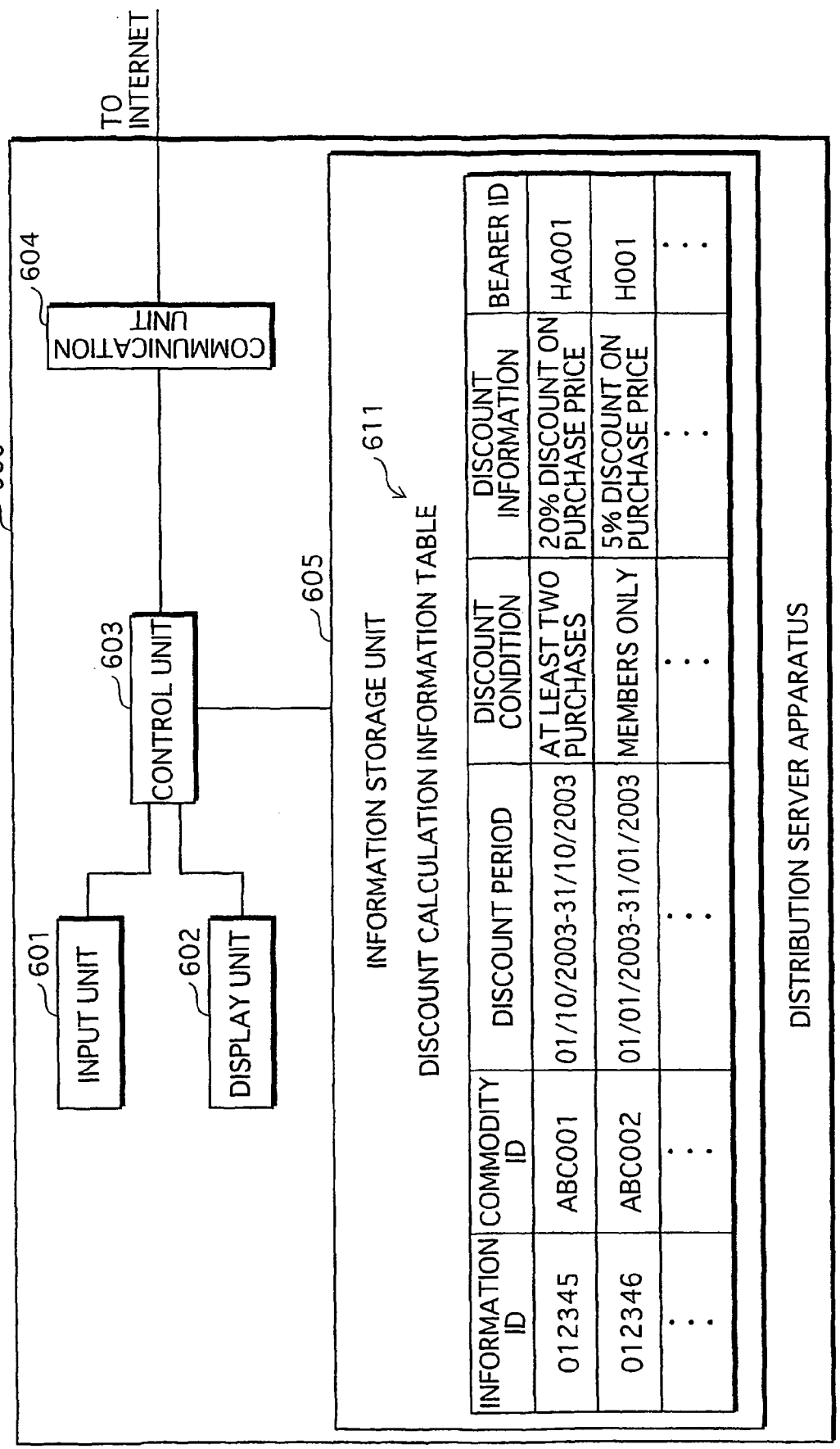

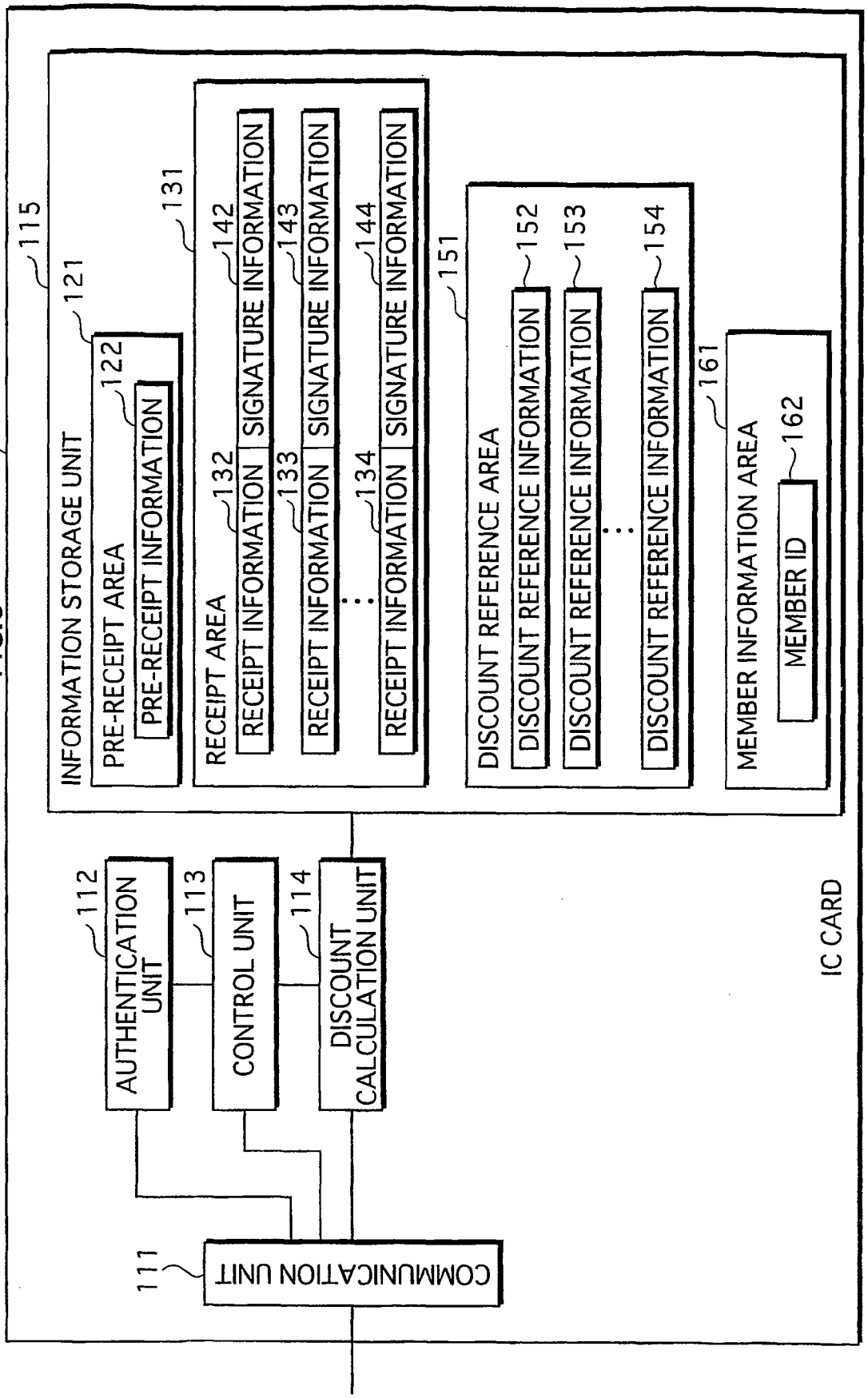

FIG. 4

PRE-RECEIPT INFORMATION 122

| PRE-RECEIPT SEGMENT | PRE |
|---|---|
| SELLER ID | H001 |
| SHOP ID | HA001 |
| RECEIPT ID | R23456 |
| SELLING TIME/DATE | 18:31 17/01/2003 |
| REGISTER ID | REG01 |
| COMMODITY SELLING INFORMATION — COMMODITY ID | ABC001 |
| UNIT PRICE | ¥100 |
| NUMBER OF UNITS | 10 |
| TOTAL PRICE OF COMMODITIES | ¥1000 |
| TAX | ¥50 |
| MANUFACTURER ID | M001 |
| BEARER ID | HA001 |
| DISCOUNT FLAG | 3: DISCOUNT NOT APPLIED |
| ⋮ | ⋮ |
| COMMODITY SELLING INFORMATION — COMMODITY ID | ABC002 |
| UNIT PRICE | ¥200 |
| NUMBER OF UNITS | 10 |
| TOTAL PRICE OF COMMODITIES | ¥2000 |
| TAX | ¥100 |
| MANUFACTURER ID | M001 |
| BEARER ID | M001 |
| DISCOUNT FLAG | 1: DISCOUNT NOT APPLICABLE |
| OVERALL TOTAL AMOUNT | ¥3150 |

FIG.5

RECEIPT INFORMATION — 132

| SELLER ID | H001 |
|---|---|
| SHOP ID | HA001 |
| RECEIPT ID | R23001 |
| SELLING TIME/DATE | 18:30 10/01/2003 |
| REGISTER ID | REG02 |
| COMMODITY SELLING INFORMATION — COMMODITY ID | ABC001 |
| UNIT PRICE | ¥100 |
| NUMBER OF UNITS | 15 |
| TOTAL PRICE OF COMMODITIES | ¥1500 |
| TAX | ¥75 |
| MANUFACTURER ID | M001 |
| BEARER ID | HA001 |
| DISCOUNT FLAG | 2: DISCOUNT APPLIED |
| COMMODITY SELLING INFORMATION — COMMODITY ID | ABC002 |
| UNIT PRICE | ¥200 |
| NUMBER OF UNITS | 15 |
| TOTAL PRICE OF COMMODITIES | ¥3000 |
| TAX | ¥150 |
| MANUFACTURER ID | M001 |
| BEARER ID | M001 |
| DISCOUNT FLAG | 1: DISCOUNT NOT APPLICABLE |
| OVERALL TOTAL AMOUNT | ¥4725 |

FIG.6

DISCOUNT REFERENCE INFORMATION  152

| INFORMATION ID | 012345 |
|---|---|
| COMMODITY ID | ABC001 |
| DISCOUNT PERIOD | 01/10/2003-31/10/2003 |
| DISCOUNT CONDITION | AT LEAST TWO PURCHASES |
| DISCOUNT INFORMATION | 20% DISCOUNT ON PURCHASE PRICE |

DISCOUNT REFERENCE INFORMATION  153

| INFORMATION ID | 012346 |
|---|---|
| COMMODITY ID | ABC002 |
| DISCOUNT PERIOD | 01/01/2003-31/01/2003 |
| DISCOUNT CONDITION | MEMBERS ONLY |
| DISCOUNT INFORMATION | 5% DISCOUNT ON PURCHASE PRICE |

FIG.7

DISCOUNT AMOUNT INFORMATION

171

| SELLER ID | | H001 |
|---|---|---|
| SHOP ID | | HA001 |
| RECEIPT ID | | R23456 |
| SELLING TIME/DATE | | 18:31 17/01/2003 |
| REGISTER ID | | REG01 |
| COMMODITY SELLING INFORMATION | COMMODITY ID | ABC001 |
| | UNIT PRICE | ¥100 |
| | NUMBER OF UNITS | 10 |
| | TOTAL PRICE OF COMMODITIES | ¥1000 |
| | TAX | ¥50 |
| | MANUFACTURER ID | M001 |
| | BEARER ID | HA001 |
| INFORMATION ID | | 012345 |
| TOTAL DISCOUNT AMOUNT | | ¥200 |

FIG.19
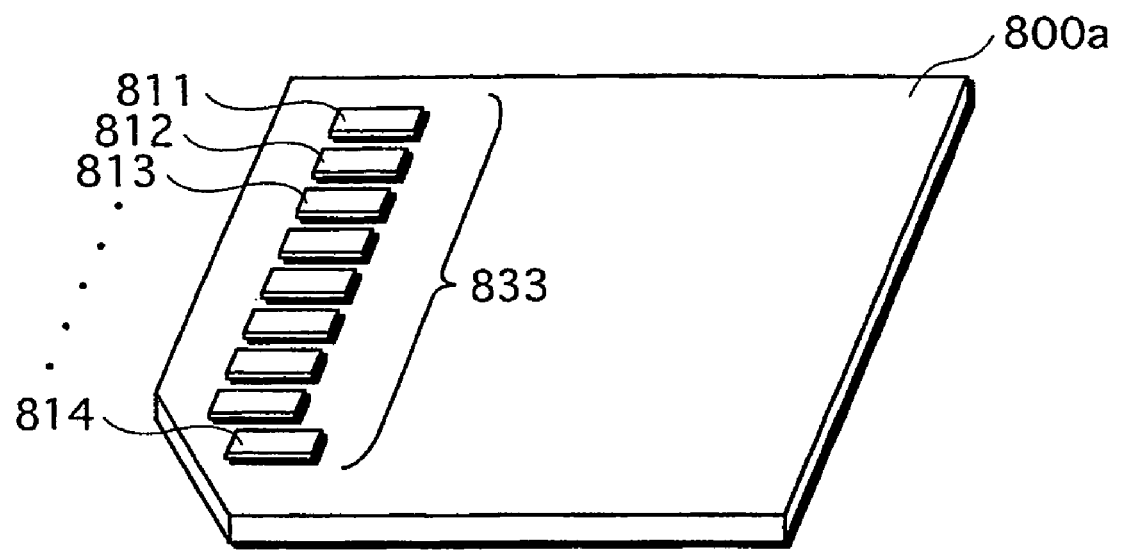
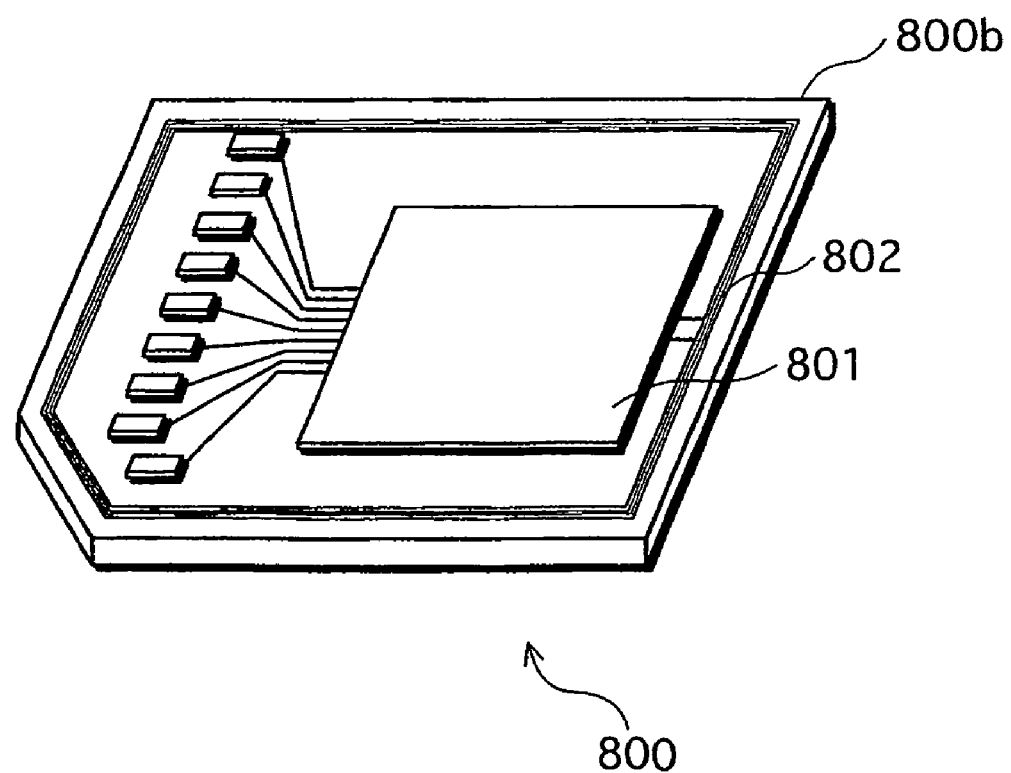

SALES SYSTEM AND RECORDING MEDIUM

TECHNICAL FIELD

The present invention relates to a recording medium on which information is recorded, and in particular to a recording medium on which commodity sales information is recorded.

BACKGROUND ART

Conventionally, sales information processing apparatuses such as cash registers used in supermarkets, specialty shops, and the like issue a receipt to a user who purchases a product or to whom a service is rendered. Printed on the receipt is commodity information regarding the product or service, a price, a date of sale, and so on.

Document 1 discloses a sales information processing system with an object of reducing expenses and effort by writing receipt information to an information recording medium, instead of issuing a receipt. The disclosed sales information processing system includes a sales information processing apparatus that process sales information, and a recording medium read/write apparatus that is connected to the sales information processing apparatus and that reads and writes information from and to an information recording medium on which information is recorded. The information recording medium is inserted into the sales information read/write apparatus when a customer makes a purchase, and the sales information read/write apparatus writes sales information to the information recording medium.

This system for processing sales information eliminates the cost of paper for receipts since receipts are not required. Additionally, this system is effective in relieving the cause of long queues of customers during busy times, since factors which contribute to this problem, such as paper jams when a receipt is being issued and the time and effort required to replace used-up receipt paper, do not arise.

<Document 1>
  Japanese Laid Open Patent Application No. 3-67395

PROBLEM TO BE SOLVED BY THE INVENTION

While the sales information processing method disclosed in Document 1 has the described advantages, elimination of the cost of paper for receipts is an advantage that is directly enjoyed only by the seller. Any reduction in the price of products or services that may result from eliminating the cost of paper for receipts will be insignificant, and not of direct advantage to the customer. Furthermore, while the advantage of relieving the cause of long queues of customers does contribute to reducing customers' waiting time, it is desirable for the customer to avoid having to queue and wait at all.

For these reasons, use of the technique disclosed in Document 1 is problematic in that it is not advantageous from the point of view of the user who purchases a product or to whom a service is rendered, because the user is unable to enjoy any direct benefits.

DISCLOSURE OF THE INVENTION

In order to solve the stated problems, the object of the present invention is to provide a sales system, a recording medium, a register apparatus, a server apparatus, a mobile information terminal, a discounting method, a discounting computer program, and a program recording medium on which the discounting computer program is recorded, that provide new incentives to a user.

The present invention is a portable memory card that includes a microprocessor, a RAM, a ROM, and a connection unit that connects to an external apparatus. The memory card has recorded thereon one or more pieces of receipt information that each indicate purchase of a product or rendering of a service.

A user who possesses the memory card purchases a product or is rendered a service at a shop, by making a payment equivalent to the regular selling price of the product or service. At this time, a register apparatus located in the shop writes receipt information indicating purchase of the product or rendering of the service to the memory card.

Each time the user purchases the same product or is rendered the same service within a subsequent set period of time, such as one week or one month, the register apparatus writes receipt information to the memory card as described above. In this way, a plurality of pieces of receipt information are written to the memory card.

The memory card is mounted in the user's mobile telephone, and according to user operation, the mobile telephone obtains discount calculation information once a month or one a week from a Web server apparatus, by connecting via a mobile telephone network and the Internet to the Web server.

The discount calculation information indicates information such as a condition to be fulfilled in order for a discount to be applied to a regular selling price when a commodity is purchased. Note that purchase of a commodity is used as a broad expression that incorporates the concept of purchasing a product and the concept of having a service rendered. The discount calculation information includes details of the discount such as a commodity ID that identifies the commodity to which the discount is applied, a period during which the discount is applicable, a discount condition, and a rate of the discount on the regular selling price.

The discount condition is, for example, information indicating a condition to be fulfilled in order for a discount to be applied to the regular selling price of the commodity. Examples of such a condition include: the commodity being purchased being discounted if the commodity has been purchased on at least two occasions in the past; if the total number of commodities purchased in the past and in the present purchase exceeds 100, the 101st commodity onwards being discounted; if the total number of commodities purchased in the past and in the present purchase exceeds 100, a discount on the total number of commodities (i.e., the total number of commodities purchased in the past and in the present purchase) being applied to the present purchase; and the commodity being discounted if the user is registered as a member to receive discount incentives administered by the seller.

At the time of the user next purchasing a product or being rendered a service, the register apparatus securely transmits pre-receipt information indicating the product being purchased or the service being received. The content of the pre-receipt information is as described above for the receipt information. The memory card securely receives the pre-receipt information and temporarily stores the received pre-receipt information. Next, the memory card judges whether a discount is to be applied, with use of the temporarily stored pre-receipt information and the stored plurality of pieces of receipt information and discount calculation information. After making the judgment, the memory card calculates the amount to be discounted from the payment for the product or the service, and securely transmits the calculated amount of the discount to the register apparatus.

The register apparatus securely receives the discount amount, calculates a discounted selling price by subtracting the received discount amount from the regular selling price, presents the calculated discounted selling price to the user, and after obtaining the user's consent, transmits an instruction to that effect to the memory card.

On receiving the instruction, the memory card calculates a discounted selling amount by subtracting the amount of the discount from the regular selling price included in the pre-receipt information, writes the calculated discounted selling price to the pre-receipt information in place of the regular selling price, and then stores the pre-receipt information as receipt information.

Note that in transmission of information between the register apparatus and the memory card, the register apparatus and the memory card perform mutual device authentication and session key sharing. The information is encrypted with a shared session key and transmitted as encrypted information, and received encrypted information is then decrypted with a session key to generate the original information.

In this way, a discount on the regular selling price is provided to the user who re-purchases a commodity with use of the memory card that stores receipt information.

Furthermore, the present invention is a sales system composed of a recording medium and a register apparatus, the recording medium including: a storage unit operable to store receipt information relating to a previous purchase of a commodity, and discount reference information indicating a method of calculating a discount on a regular selling price of a commodity; a calculation unit operable to calculate, based on the stored receipt information and the stored discount reference information, an amount of a discount on a commodity to be newly purchased; and an output unit operable output the calculated amount, and the register apparatus including: a reception unit operable to receive the amount; a calculation unit operable to calculate a discounted selling price by subtracting the amount from a regular selling price of the commodity to be purchased; and a payment processing unit operable to perform processing for sale of the commodity at the calculated discounted selling price.

Furthermore, the present invention is a sales system including a recording medium and a register apparatus, wherein the recording medium includes: a storage unit operable to store condition information that indicates a condition to be fulfilled in order for a discount to be applied to a regular selling price of the commodity, and calculation method information indicating a method for calculating a discount amount; a judgment unit operable to judge, when the commodity is being purchased, whether the discount is to be applied, based on the condition information; a calculation unit operable to calculate, when the judgment unit judges that the discount is to be applied, the discount amount, based on the calculation method information; and an output unit operable to output the calculated discount amount, and the register apparatus includes: a reception unit operable to receive the discount amount; a calculation unit operable to calculate a discounted selling price of the commodity by subtracting the discount amount from the regular selling price; and a payment processing unit operable to perform settlement processing for payment for selling the commodity at the calculated discounted selling price.

BRIEF DESCRIPTION OF THE DRAWINGS

FIG. 1 is a block diagram showing the structure of a sales system 10;

FIG. 2 is a block diagram showing the structure of a distribution server apparatus 600;

FIG. 3 is a block diagram showing the structure of an IC card 100;

FIG. 4 shows the data structure of pre-receipt information 122;

FIG. 5 shows the data structure of receipt information 132;

FIG. 6 shows the data structure of discount reference information 152 and 153;

FIG. 7 shows the data structure of discount amount information 171;

FIG. 19 is an exploded view of a noncontact IC card 800;

FIG. 21 is a block diagram showing the structure of a mobile telephone 500a; and FIG. 22 is a block diagram showing the structure of a mobile telephone 500b and a noncontact IC card 800a.

BEST MODE FOR CARRYING OUT THE INVENTION

1. Embodiment

Figure 8:
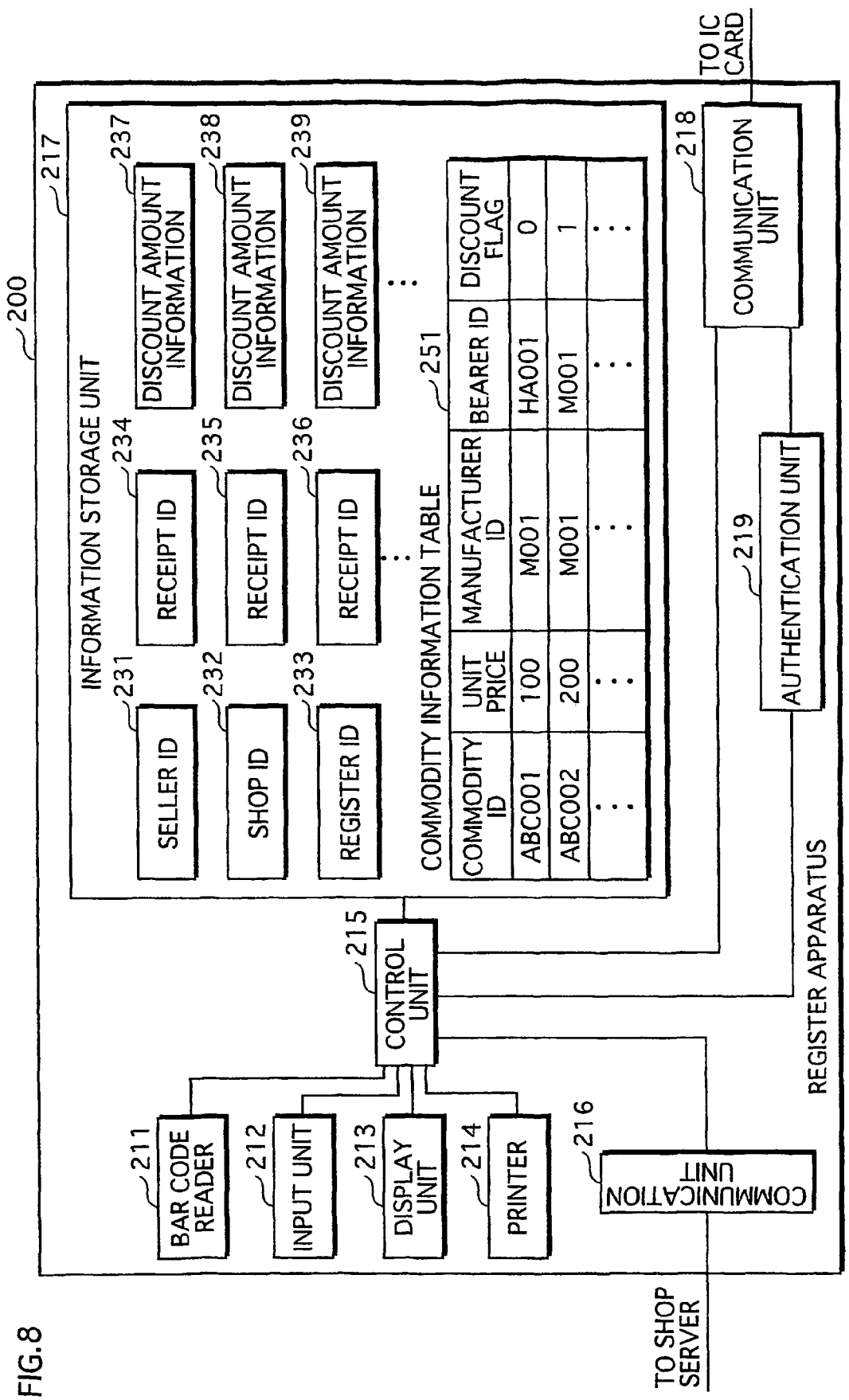
FIG. 8 is a block diagram showing the structure of a register apparatus 200.

The following describes a sales system 10 as one embodiment of the present invention.

1.1 Structure of the Sales System 10

The sales system 10, as shown in FIG. 1, is composed of IC cards including an IC card 100, an IC card 101, an IC card 102 and an IC card 103, register apparatuses including a register apparatus 200, a register apparatus 201, a register apparatus 202 and a register apparatus 203, shop server apparatuses 300 and 301, a manufacturer server apparatus 400, a mobile telephone 500, a distribution server 600, and a personal computer 700.

A user possesses the mobile telephone 500 and the IC card 100. The IC card 100 stores one or more pieces of receipt information indicating commodities purchased by the user in the past.

The distribution server apparatus 600 transmits discount calculation information, which shows a method for calculating a discounting for a commodity, via the Internet 23, a mobile telephone network 22, and a wireless base station 21 to the user's mobile telephone apparatus 500. The mobile telephone apparatus 500 receives the discount calculation information, and writes the received discount calculation information to the IC card 100 which is loaded in the mobile telephone 500.

The shop server apparatus 300 and the register apparatuses 200 and 201 are located in a shop 51, and the register apparatuses 200 and 201 are connected to the shop server 300 which is connected to the Internet 23. The shop server apparatus 300 and the register apparatuses 200 and 201 are administered by a retail seller who manages the shop 51.

The shop 51 sells products and/or renders services. Noted that term "commodity" is used hereinafter for convenience, and should be interpreted as incorporate the concepts of both products and services. Likewise, "selling a commodity" should be interpreted as incorporating the concepts of both selling products and providing services.

The IC card 100 is loaded into the register apparatus 200 when the user purchases a commodity at the shop 51, and, based on the pieces of receipt information and discount calculation information stored on the IC card 100, calculates discount amount information showing a discount amount for the commodity that the user is to purchase, and transmits the discount amount information to the register apparatus 200.

The register apparatus 200 receives the discount amount information from the IC card 100, calculates a discounted selling price of the commodity based on the received discount amount information, and indicates the selling price to the user. Next, if the user agrees to purchase the commodity at the indicated discounted selling price, the register 200 instructs the ID card 100 to write receipt information showing purchase of the product at the discounted selling price.

The shop server 301 and the register apparatuses 202 and 203 are located at the shop 52, in the same manner as shop server 300 and the resister apparatuses 200 and 201 at the shop 51, and the register apparatuses 202 and 203 are connected to the shop server 301. In FIG. 1, the IC cards 102 and 103 are loaded in the register apparatuses 202 and 203, respectively, and the shop server apparatus 301 is connected to the Internet 23. The shop server 301 and the register apparatuses 202 and 203 are identical in structure to the shop server 300 and the register apparatuses 200 and 201, respectively.

The manufacturer server apparatus 400, which is owned by a manufacturer of commodities, is connected to the Internet 23.

The personal computer 700 is located at the home of the user. The IC card 100 is loadable in the personal computer 700.

1.2 Distribution Server Apparatus 600

The distribution server apparatus 600, as shown in FIG. 2, is composed of an input unit 601, a display unit 602, a control unit 603, a communication unit 604, and an information storage unit 605.

The distribution server apparatus 600 is managed by a distributor who is entrusted by the retail seller to distribute discount calculation information (described later) on behalf of the retail seller to users. Specifically, the distribution server apparatus 600 is computer system composed of a microprocessor, a ROM, a RAM, a hard disk unit, a display unit, a keyboard, a mouse and the like. Computer programs are stored in the RAM or the hard disk unit, and the distribution server 600 achieves its functions by the microprocessor operating according to the computer programs.

(1) Information Storage Unit 605

The information storage unit 605, as shown in FIG. 2, has a discount calculation information table 611. As shown as one example in FIG. 2, the discount calculation information table 611 includes a plurality of pieces of discount calculation information that have been registered in advance, and that are each composed of an information ID, a commodity ID, a discount period, a discount condition, discount information, and a bearer ID. Each piece of discount calculation information includes information relating to a discount on the regular selling price of a commodity.

The information ID is identification information that uniquely identifies the piece of discount calculation information in which the information ID is included.

The commodity ID is identification information that identifies the commodity to which the discount is applicable.

The discount period indicates a period within which the discount on the regular selling price of the commodity is applicable, and is composed of a discount start date which is the date on which the period starts, and a discount end date which is the date on which the period ends.

The discount condition is information indicating a condition that must be fulfilled for the discount to be applied to the regular selling price of the commodity. Examples of the discount condition include: (i) the commodity being purchased being discounted if the commodity has been purchased on at least two occasions in the past; (ii) if the total number of commodities purchased in the past and in the present purchase exceeds 100, the 101st commodity onwards being discounted; (iii) if the total number of commodities purchased in the past and in the present purchase exceeds 100, a discount on the total number of commodities (i.e., the total number of commodities purchased in the past and in the present purchase) being applied to the present purchase; and (iv) the commodity being discounted if the user is registered as a member to receive discount incentives administered by the distributor.

The discount information is information indicating a discount rate that is the amount or percentage of the discount from the regular selling price of the commodity. Examples of the discount information include a 100 yen discount, and a 20% percent discount.

The bearer ID is identification information identifying the party by whom the discount is borne.

(2) Control Unit 603

In response to a request from the mobile telephone 500, the control unit 603 reads stored discount calculation information from the information storage unit 605, and transmits the read discount calculation information to the mobile telephone 500 via the communication unit 604, the Internet 23, the mobile telephone network 22, and the wireless base station 21.

(3) Communication Unit 604, Input Unit 601, and Display Unit 602

The communication unit 604 transmits and receives information between the control unit 603 and an external apparatus connected via the Internet.

The input unit 601 receives input from an operator of the distribution server 600.

The display unit 602 displays various information under the control of the control unit 603.

1.3 IC Card 100

The IC card 100 is a portable memory card which, as shown in FIG. 3, is composed of a communication unit 111, an authentication unit 112, a control unit 113, a discount calculation unit 114, and an information storage unit 115.

The IC card 100 is loaded in any of the register apparatuses 200, 201, 202, 203 or the personal computer 700, thereby being electrically connected thereto.

Specifically, the IC card 100 is a computer system composed of a microprocessor, a ROM, a RAM, and so on. A computer program is stored in the RAM, and the IC card 100 achieves it functions by the microprocessor operating according to the computer program.

(1) Information Storage Unit 115

The information storage unit 115, as shown in FIG. 3, has a pre-receipt area 121, a receipt area 131, a discount reference area 151, and a member information area 161.

<Pre-Receipt Area 121>

The pre-receipt area 121 is for storing one piece of pre-receipt information 122.

The pre-receipt information indicates, when the user is making a purchase of a commodity, the regular selling price of the commodity before it has been determined whether or not the regular selling price is to be discounted, and other information. After it has been determined whether or not the regular selling price is to be discounted, a discounted selling price is calculated by subtracting the discount amount from the regular selling price, and the pre-receipt information which includes the calculated discounted selling price is stored in the IC card 100 as receipt information.

As shown as one example in FIG. 4, the pre-receipt information 122 is composed of a pre-receipt segment, a seller ID, a shop ID, a receipt ID, a selling time/date, a register ID, a plurality of pieces of commodity selling information, and an overall total amount. Each piece of commodity selling information corresponds to a commodity that has been sold, and indicates a commodity ID, a unit price, a number of units, a total price of commodities, tax, a manufacturer ID, a bearer ID, and a discount flag.

The pre-receipt segment is a flag indicating that the information is pre-receipt information. As one specific example, a value "PRE" may be used in the pre-receipt segment to indicate that the information is pre-receipt information.

The seller ID is identification information that identifies the retail sales company to which the shop selling the commodity indicated in the commodity selling information belongs.

The shop ID is identification information that identifies the shop selling the commodity.

The receipt ID is identification information that uniquely identifies the pre-receipt information.

The selling time/date indicates the time and date of selling the commodity.

The register ID is identification information that identifies the register apparatus used to sell the commodity.

The commodity ID is identification information that identifies the commodity.

The unit price is the selling price per unit of the commodity, and is the regular selling price without a discount.

The number of units indicates how many units of the commodity sold.

The total price of commodities is an amount arrived at by multiplying the unit price by the number of units, and indicates the selling price for the indicated number of units of the commodity.

Tax is the amount of tax charged with respect to the total price of commodities.

The manufacturer ID is identification information identifying the manufacturer of the commodity.

The bearer ID is identification information identifying the party by whom the discount is borne when the selling price of the commodity be discounted.

The discount flag indicates whether or not a discount is applicable for the commodity. A value "1" of the flag indicates that a discount is not applicable for the commodity, while any other value of the flag indicates that a discount is applicable for the commodity.

The overall total amount is an amount obtained by adding the total price of commodities in each piece of commodity selling information.

<Receipt Area 131>

The receipt area 131, as one example shown in FIG. 3, stores pairs of pieces of information in advance, specifically including a pair consisting of receipt information 132 and signature data 142, a pair consisting of receipt information 133 and signature data 143, and a pair consisting of receipt information 134 and signature data 144.

The receipt information is information indicating, when the user purchases a commodity, the selling price of commodity determined after establishing whether or not a discount is applicable to the regular selling price. Each piece of receipt information is stored in correspondence with signature data.

The receipt information 132, as shown in one specific example in FIG. 5, is composed of a seller ID, a shop ID, a receipt ID, a selling time/date, a register ID, two pieces of commodity selling information, and an overall total amount. Each piece of commodity selling information is composed of a commodity ID, a unit price, a number of units, a total price of commodities, tax, a manufacturer ID, a bearer ID, and a discount flag, all of which correspond to the sold commodity. The other receipt information has the same structure as the receipt information 132.

The unit price is the selling price per unit of commodity after determining whether or not a discount is applicable to the regular selling price. The unit price is either the regular selling price of the discounted selling price.

The seller ID, shop ID, receipt ID, selling time/date, register ID, commodity selling information, and overall total amount included in the receipt information 132 are as described earlier, and therefore not described here. Furthermore, the commodity ID, number of units, total price of commodities, tax, manufacturer ID, and bearer ID included in each piece of commodity selling information are as described earlier, and therefore not described here.

The discount flag indicates either that a discount is not applicable to the commodity, or, when a discount is applicable, that the discount has already been applied. A value "1" of the discount flag indicates that a discount is not applicable, while a value "2" of the discount flag indicates that the discount has been applied.

The signature data 142 is data generated by the register apparatus that issued the pre-receipt information on which the receipt information 132 is based, by applying a digital signature algorithm to the receipt information 132. Here, the digital signature algorithm conforms to the ElGamal signature scheme. The other digital signature data is the same as the signature data 142.

<Discount Reference Area 151>

The discount reference area 151, as one example shown in FIG. 3, stores in advance pieces of discount reference information including discount reference information 152, 153, and 154.

The discount reference information 152, as one example shown in FIG. 6, includes an information ID, a commodity ID, a discount period, a discount condition, and discount information. The information ID, commodity ID, discount period, discount condition, and discount information are as described earlier, and therefore are not described here.

<Member Information Area 161>

The member information area 161, as one example shown in FIG. 3, stores one member ID 162 in advance.

The member ID 162 is identification information that identifies a party who has registered in advance with the retail sales company as a consumer able to take advantage of the discount incentives provided by the retail sales company to which the shops 51 and 52 belong. This identification information is assigned to the user who possesses the IC card 100.

(2) Authentication Unit 112

The authentication unit 112 performs mutual device authentication and key sharing with the register apparatus 200, under the control of the control unit 113. Mutual device authentication and key sharing are described in detail later.

When the authentication process has finished, the authentication unit 112 outputs result information that indicates whether authentication has succeeded or failed.

If authentication has succeeded, the authentication unit 112 outputs a session key K' obtained according to the key sharing, to the control unit 113.

(3) Control Unit 113

<Operations when the IC Card 100 is Loaded in the Register Apparatus 200>

The control unit 113 receives connection information indicating connection with the register apparatus 200 from the communication unit 111.

On receiving the connection information, the control unit 113 controls the authentication unit 112 to have it perform mutual device authentication and key sharing with the register apparatus 200.

Next, the control unit 113 receives result information indicating either success or failure of authentication, from the authentication unit 112. In the case of success, the control unit 113 further receives the shared session key K' from the authentication unit 112.

Here, on receiving result information indicating failure, in other words when authentication by the authentication unit 112 has failed, the control unit outputs communication end information, which indicates ending reception/transmission with the register apparatus 200, to the control unit 111 in order to end reception/transmission with the register apparatus 200.

On the other hand, on receiving result information indicating success, in other words when authentication by the authentication unit 112 has succeeded, the control unit 113 receives encrypted pre-receipt information from the register apparatus 200 via the communication unit 111. Next, as described earlier, the control unit 113 receives the session key K', and applies a decryption algorithm D1 to the received encrypted pre-receipt information with use of the received session key K', thereby generating pre-receipt information.

Note that the decryption algorithm D1 complies with DES (Data Encryption Standard).

Next, the control unit 113 writes the generated pre-receipt information to the pre-receipt area 121 of the information storage unit 115.

<Operations After Receiving Discount Payment Information from the Register Apparatus 200>

The control unit 113 receives discount payment information indicating whether payment is to be made with a discount or without a discount, from the register apparatus 100 via the communication unit 111. When the discount payment information indicates that payment is to be made without a discount, the control unit 113 performs "without-discount processing" described below, and when the discount payment information indicates that payment is to be made with a discount, the control unit 113 performs "with-discount processing" also described below.

<Without-Discount Processing>

The following describes processing performed with a discount is not applicable.

The control unit 113 receives receipt information signature data, and a receipt conversion instruction indicating conversion of pre-receipt information into receipt information, from the register apparatus 200 via the communication unit 111.

In response to the received receipt conversion instruction, the control unit 113 reads the pre-receipt information stored in the pre-receipt area 122, and deletes the pre-receipt segment from the read pre-receipt information, thereby generating receipt information. Next, the control unit 113 writes the generated receipt information and the received signature data to the receipt area 131 in correspondence. Here, the control unit 113 deletes the pre-receipt information from the pre-receipt area 121.

The control unit 113 performs other processing if information other than a receipt conversion instruction is received.

Receipt information is written to the IC card 100 according to the described processing when a discount is not applicable.

<With-Discount Processing>

The following describes processing performed when a discount is applicable.

The control unit 113 reads all receipt information 132, 133, 134, and so on stored in the receipt area 131, and reads the pre-receipt information stored in the pre-receipt area 121.

Next, the control unit 113 extracts, from among the pieces of sold product information included in the read pre-receipt information 122, those pieces that include a discount flag indicating that a discount is applicable. The control unit 113 then extracts the commodity ID from each of the extracted pieces of sold product information, and then reads the pieces of discount reference information that include the extracted commodity IDs, from the discount reference area 151.

Next, the control unit 113 outputs the read pre-receipt information 122, the extracted pieces of commodity selling information, all the read pieces of receipt information, and the discount reference information to the discount calculation unit 114. The control unit 113 instructs the discount calculation unit 114 to generate discount amount information, and then receives the discount amount information from the discount calculation unit 114.

Next, the control unit 113 instructs the authentication unit 112 to perform mutual device authentication and key sharing with the register apparatus 112.

Here, on receiving result information indicating authentication failure, in other words, when authentication by the authentication unit 112 has failed, the control unit 113 outputs communication end information, which indicates ending reception/transmission with the register apparatus 200, to the control unit 111 in order to end reception/transmission with the register apparatus 200, as described earlier.

On the other hand, on receiving result information indicating success, in other words when authentication by the authentication unit 112 has succeeded, the control unit 113 further receives the session key K' from the authentication unit 112, and applies an encryption algorithm E2 to the discount amount information received from the discount calculation unit 114, with use of the received session key K', thereby generating encrypted discount amount information.

Note that the encryption algorithm E2 complies with DES.

Next, the control unit 113 applies a digital signature algorithm SIG to the discount amount information, thereby generating signature data.

Note that the digital signature algorithm SIG conforms to the ElGamal signature scheme.

Next, the control unit 113 outputs the generated encrypted discount amount information and the signature data to the register apparatus 200 via the communication unit 111.

Furthermore, the control unit 113 receives a receipt conversion instruction indicating conversion of pre-receipt information into receipt information, and a receipt information digital signature, from the register apparatus 200 via the communication unit 111. Here, on receiving the receipt conversion information, the control unit 113 converts the pre-receipt information 122 stored in the pre-receipt area 121 into receipt information in the manner described earlier, writes the receipt information and the receipt information digital signature in correspondence to the receipt area 131, and deletes the pre-receipt information 122 from the pre-receipt area 121.

When a receipt conversion instruction is not received, the control unit 113 performs other processing.

Receipt information is written to the IC card 100 according to the described processing when a discount is applicable.

(4) Discount Calculation Unit 114

The discount calculation unit 114 receives the pre-receipt information, the commodity selling information, and all the pieces of receipt information and discount reference information from the control unit 113, and also receives an instruction to generate discount amount information from the control unit 113.

On receiving such an instruction, the discount calculation unit 114 generates discount amount information 171, of which one example is shown in FIG. 7. In the example shown in FIG. 7, the discount amount information 171 is composed of a seller ID, a shop ID, a receipt ID, a selling time/date, a register ID, commodity selling information, an information ID, and a total discount amount. The commodity selling information includes a commodity ID, a unit price, a number of units, a total price of commodities, tax, a manufacturer ID, and a bearer ID.

Here, the discount calculation unit 114 uses the seller ID, shop ID, receipt ID, selling time/date, and register ID included in the received pre-receipt information as the seller ID, shop ID, receipt ID, selling time/date, and register ID, respectively, included in the discount amount information 171.

Furthermore, the discount calculation unit 114 uses the received commodity selling information as the commodity selling information included in the discount amount information 171.

Next, using all the receipt information and discount reference information, the discount calculation unit 114 judges whether or not the commodity identified by commodity ID in the commodity selling information is to be discounted.

For example, if the discount condition included in the discount reference information indicates the commodity presently being purchased being discounted if the commodity has been purchased on at least two occasions in the past, the discount calculation unit 114 judges in the following manner whether or not a discount is applicable.

1) The discount calculation unit 114 extracts, from among all the pieces of receipt information, those pieces that include a commodity ID that is identical to the commodity ID included in the received commodity selling information.

2) The discount calculation unit 114 counts the number of pieces of receipt information.

3) The discount calculation unit 114 judges whether the counted number of pieces of receipt information is at least two.

4) When the counted number is at least two, the discount calculation unit 114 determines that the commodity has been purchased on at least two occasions in the past, and judges that a discount is applicable on the present purchase. When the counted number is not at least two, the discount calculation unit 114 judges that a discount is not applicable.

As a further example, if the discount condition included in the discount reference information indicates that if the total number of commodities purchased in the past and on the present purchase exceeds 100, the 101st commodity onwards is discounted, the discount calculation unit 114 judges in the following manner whether or not a discount is applicable.

1) The discount calculation unit 114 extracts, from among all the pieces of receipt information, those pieces that include a commodity ID that is identical to the commodity ID included in the received commodity selling information.

2) The discount calculation unit 114 extracts the number of units from the extracted receipt information.

3) The discount calculation unit 114 totals all of the extracted numbers of units, thereby calculating a total number of units.

4) The discount calculation unit 114 extracts the number of units corresponding to the commodity ID from the pre-receipt information.

5) The discount calculation unit 114 totals the calculated total number of units and the number of units extracted from the pre-receipt information, thereby calculating an overall total number of units.

6) The discount calculation unit 114 judges whether the calculated overall total number of units is at least 100.

7) If the total number of units is at least 100, the discount calculation unit 114 determines that the total number of the commodity purchases in the past and in the present purchase exceeds 100, and judges that a discount is applicable on the present purchase. When the counted number is not at least 100, the discount calculation unit 114 judges that a discount is not applicable.

As yet a further example, if the discount condition included in the discount reference information indicates that a discount is applicable on the present purchase if the user is registered as a member to receive discount incentives administered by the distributor, the discount calculation unit 114 obtains the member ID from the control unit 113, and on obtaining the member ID, determines that the user is registered as a member to receive discount incentives administered by the distributor, and then judges whether a discount is applicable.

When a discount is judged to be applicable, the discount calculation unit 114 calculates, with use of all the receipt information and discount reference information, the amount to be discounted (the discount amount) from the commodity identified by the commodity included in the received commodity selling information. When a discount is judged not to be applicable, the discount calculation unit 114 sets the discount amount to "0". Next, the discount calculation unit 114 subtracts the calculated discount amount from the unit price in the commodity selling information included in the discount amount information 171, and overwrites the unit price in the commodity selling information with the value obtained according to the subtraction, as a new unit price.

Next, the discount calculation unit 114 multiplies the new unit price with the number of units in the commodity selling information, and overwrites the total price of commodities in the commodity selling information with the obtained value, as a new total price of commodities.

The discount calculation unit 114 calculates the tax, based on the new total price of commodities, and overwrites the tax in the commodity selling information with the calculated tax.

The discount calculation unit 114 sets the information ID in the received discount reference information as the information ID in the discount amount information 171.

The discount calculation unit 114 multiplies the calculated discount amount with the number of units, and sets the value obtained from this multiplication as the total discount amount in the discount amount information 171.

The discount calculation unit 114 generates discount amount information in this way, and outputs the generated discount amount information to the control unit 113.

(5) Communication Unit 111

When the IC card 100 is loaded in the register apparatus 200, the communication unit 111 detects that the IC card 100 is loaded. On detecting, the IC card 100 outputs connection information indicating that the register apparatus 200 and the IC card 100 are connected, to the control unit 113.

In addition, the communication unit 111 transmits and receives information between the control unit 113 and the register apparatus 200, under the control of the control unit 113.

Furthermore, the communication unit 111 receives communication end information from the control unit 113. On receiving communication end information, the communication unit 111 ends transmission/reception with the register apparatus 200.

Furthermore, the communication unit 111 performs communication in the same manner with any other apparatus in which the IC card 100 is loaded.

1.4 Register Apparatus 200

In addition to managing sales of commodities, the register apparatus 200 is also a sales cash management apparatus.

The register apparatus 200, as shown in FIG. 8, is composed of a barcode reader 211, an input unit 212, a display unit 213, a printer 214, a control unit 215, a communication unit 216, an information storage unit 217, a communication unit 218, an authentication unit 219, and other components that are not illustrated, such as a safe-keeping compartment for cash.

Specifically, the register apparatus 200 is a computer system composed of a microprocessor, a ROM, a RAM, and so on. A computer program is stored in the RAM, and the register apparatus 200 achieves part of its functions by the microprocessor operating according to the computer program.

Note that the other register apparatuses are identical in structure to the register apparatus 200, and therefore are not described here.

(1) Information Storage Unit 217

The information storage unit 217, as shown in FIG. 8, stores a seller ID 231, a shop ID 232, a register ID 233, pieces of receipt information including receipt information 234, 235, and 236, pieces of discount amount information including discount amount information 237, 238, and 239, and a commodity information table 251. Here, the pieces of receipt information including receipt information 234, 235, and 236 are stored in correspondence with the pieces of discount amount information including discount amount information 237, 238, and 239.

The seller ID 231 is identification information that identifies the retail sales company that manages the shop 51 in which the register apparatus 200 is located.

The shop ID 232 is identification information that identifies the shop 51 in which the register apparatus 200 is located.

The register ID 233 is identification information that identifies the register 200.

The receipt information 234 is generated by the register apparatus 200, and is identical in structure to the receipt information stored on the IC card 100. The other pieces of receipt information 235, 236, and so on also have the same structure.

The discount amount information 237 is received from the IC card 100, and is identical in structure to the discount amount information generated by the IC card 100. The other pieces of discount amount information 238, 239, and so on also have the same structure.

The commodity information table 251, as shown in FIG. 8, includes a plurality of pieces of commodity information, each of which is composed of a commodity ID, a unit price, a manufacturer ID, a bearer ID, and a discount flag.

Each piece of commodity information corresponds to a commodity.

The commodity ID is identification information that identifies a commodity.

The unit price is the regular selling price per unit of the commodity.

The manufacturer ID is identification information that identifies the manufacturer of the commodity.

The bearer ID is identification information that identifies the party by whom the discount amount is borne when the selling price of the commodity is discounted.

The discount flag indicates whether or not a discount is applicable for the commodity, and has a value of either "0" or "1". The value "0" of the flag indicates that a discount is not applicable for the commodity, while the value "1" of the flag indicates that a discount is applicable for the commodity.

(2) Barcode Reader 211

The barcode reader 211 reads, according to an operation by the operator of the register apparatus 200, a commodity ID that identifies the commodity, from a barcode attached to the packaging of the commodity, and outputs the read commodity ID from the control unit 215.

Since barcode readers are commonly known, a detailed description thereof is omitted here.

(3) Input Unit 212, Display Unit 213, Printer 214

The input unit 212, according to an operation by the operator of the register apparatus 200, receives the number of commodities being sold, an operation indicating completion of input of the commodities being purchased by the user, and also receives input of whether payment by the user is to be by cash or whether payment is to be discounted. The input unit 213 outputs the input number of commodities, end information indicating the end of input, and information indicating whether payment is to be by cash or whether payment is to be discounted, to the control unit 215.

(4) Control Unit 215

The control unit 215 receives the commodity ID from the barcode reader 211.

The control unit 215 also receives the number of units, the end information indicating completion of input of commodities, and payment information indicating either payment by cash or payment with a discount.

The control unit 215 reads the commodity information of the received commodity ID from the commodity information table 251, extracts the unit price from the read commodity information, and multiplies the extracted unit price with the received number of units, thereby calculating the total price of commodities.

Next, the control unit 215 controls the input unit 212 and the barcode reader 211 to repeat processing, until the control unit 215 receives end information indicating completion of input of the commodities from the input unit 212.

When the control unit 215 had received the end information, and has further received payment information indicating payment by cash, the register apparatus 200 receives payment by cash.

When the control unit 215 had received the end information, and has further received payment information indicating discounted payment, the control unit 215 performs the following operations.

The control unit 215 generates a pre-receipt segment having the value "PRE", reads the seller ID 213, the shop ID 232, and the register ID 233 from the information storage unit 217, generates selling time/date information consisting of the present time and date, and generates a unique receipt ID. Then the control unit 215 appends the number of units, the calculated total price of commodities, and tax to the commodity information read from the commodity information table 251, thereby generating commodity selling information, and calculates an overall total amount that is the total of all the total prices for commodities. Next, the control unit 215 generates pre-receipt information composed of the seller ID, the shop ID, the receipt ID, the selling time/date, the register ID, the generated commodity selling information, and the overall total amount.

The control unit 215 then controls the authentication unit 219 so as to perform mutual device authentication and key sharing with the IC card 100.

The control unit 215 subsequently receives result information indicating success or failure of authentication from the authentication unit 219.

On receiving result information indicating failure, the control unit 215 controls the register apparatus 200 so as to accept cash payment, and the register apparatus 200 subsequently ends processing for selling commodities to the user.

When authentication by the authentication unit 219 is successful, in other words on receiving result information indicating success in authentication, the control unit 215 receives a session key K from the authentication unit 219, and applies an encryption algorithm E1 to the generated pre-receipt information, with use of the received session key K, thereby generating encrypted receipt information.

Note that the encryption algorithm E1 complies with DES.

Next, the control unit 215 outputs the generated encrypted pre-receipt information to the IC card 100 via the communication unit 218.

The control unit 215 receives discount payment information that indicates either payment with discount or payment without discount. When the received discount payment information indicates payment without discount, the control unit 215 performs "without-discount" processing described below. When the received discount payment information indicates payment with discount, the control unit 215 performs "with-discount" processing described below.

<Without-Discount Processing>

The following describes processing performed when a discount is not applicable.

The control unit 215 deletes the pre-receipt segment from the generated pre-receipt information, thereby generating receipt information, applies the digital signature algorithm SIG to the generated receipt information, thereby generating receipt information signature data, and outputs the generated signature data and a receipt conversion instruction indicating conversion of pre-receipt information into receipt information to the IC card 100 via the communication unit 218. In addition, the control unit 215 writes the generated receipt information to the information storage unit 217.

<With-Discount Processing>

The following describes processing performed when a discount is applicable.

The control unit 215 controls the authentication unit 219 so as to perform mutual authentication and key sharing with the IC card 100.

When authentication by the authentication unit 219 fails, the control unit 215 controls the register apparatus 200 to receive cash payment, and the register apparatus 200 subsequently ends processing for selling commodities to the user.

On the other hand, when authentication by the authentication unit 219 succeeds, the control unit 215 receives encrypted discount amount information and signature data from the IC card 100 via the communication unit 218, and further receives the session key K from the authentication unit 219. The control unit 215 then applies a decryption algorithm D2 to the received encrypted discount amount information, thereby generating discount amount information. Note the decryption algorithm D2 complies with DES.

Next, the control unit 215 performs verification of the received digital data with use of a verification algorithm VFY. Note that the verification algorithm VFY complies with the ElGamal signature system.

When verification of the signature data fails, the control unit 215 ends the processing.

When the verification of the signature data succeeds, the control unit calculates the discounted selling price based on the received discount amount information, and the register apparatus 200 receives money equivalent to the discounted selling price from the user.

Furthermore, as described earlier, the control unit 215 replaces the receipt information with the pre-receipt information, and by updating the total price of commodities and the overall total amount included in the receipt information, generates receipt information. Next, the control unit 215 applies the digital algorithm SIG to the generated receipt information, thereby generating signature data, and outputs the generated signature data and a receipt conversion instruction instructing conversion of pre-receipt information into receipt information, to the IC card 100 via the communication unit 218.

Next, the control unit 215 writes the generated receipt information to the information storage unit 217, and writes the generated discount amount information to the information storage unit 217.

<Transfer Processing to the Shop Server Apparatus 300>

When the shop 51 has finished business for the day, all receipt information and discount amount information stored in the register apparatus 200 is transferred to the shop server 300. The following describes transfer of the receipt information and discount amount information from the register apparatus 200 to the shop server 300.

The control unit 215 reads all receipt information from the information storage unit 217, and transmits the read receipt information to the shop server 300 via the communication unit 216.

In addition, the control unit 215 reads all discount amount information from the information storage unit 217, and transmits the read discount amount information to the shop server 300 via the communication unit 216.

When transfer is complete, the control unit deletes all receipt information and discount amount information from the information storage unit 217.

In this way, all receipt information and discount amount information is transferred from the register apparatus 200 to the shop server 300.

(5) Communication Unit 216

The communication unit 216 transmits and receives information between the control unit 215 and the shop server 300, under the control of the control unit 215.

(6) Communication Unit 218

The communication unit 218 transmits and receives information between the control unit 215 and the IC card 100, under the control of the control unit 215.

(7) The Authentication Unit 219

The authentication unit 219 performs mutual device authentication and key sharing with the IC card 100, under the control of the control unit 215.

The mutual device authentication and key sharing are described in detail later.

When authentication is complete, the authentication unit 219 outputs result information indicating either success or failure of authentication, to the control unit 215.

When authentication succeeds, the authentication unit 215 outputs a session key K obtained according to key sharing to the control unit 215.

1.5 Shop Server Apparatus 300

Figure 9:
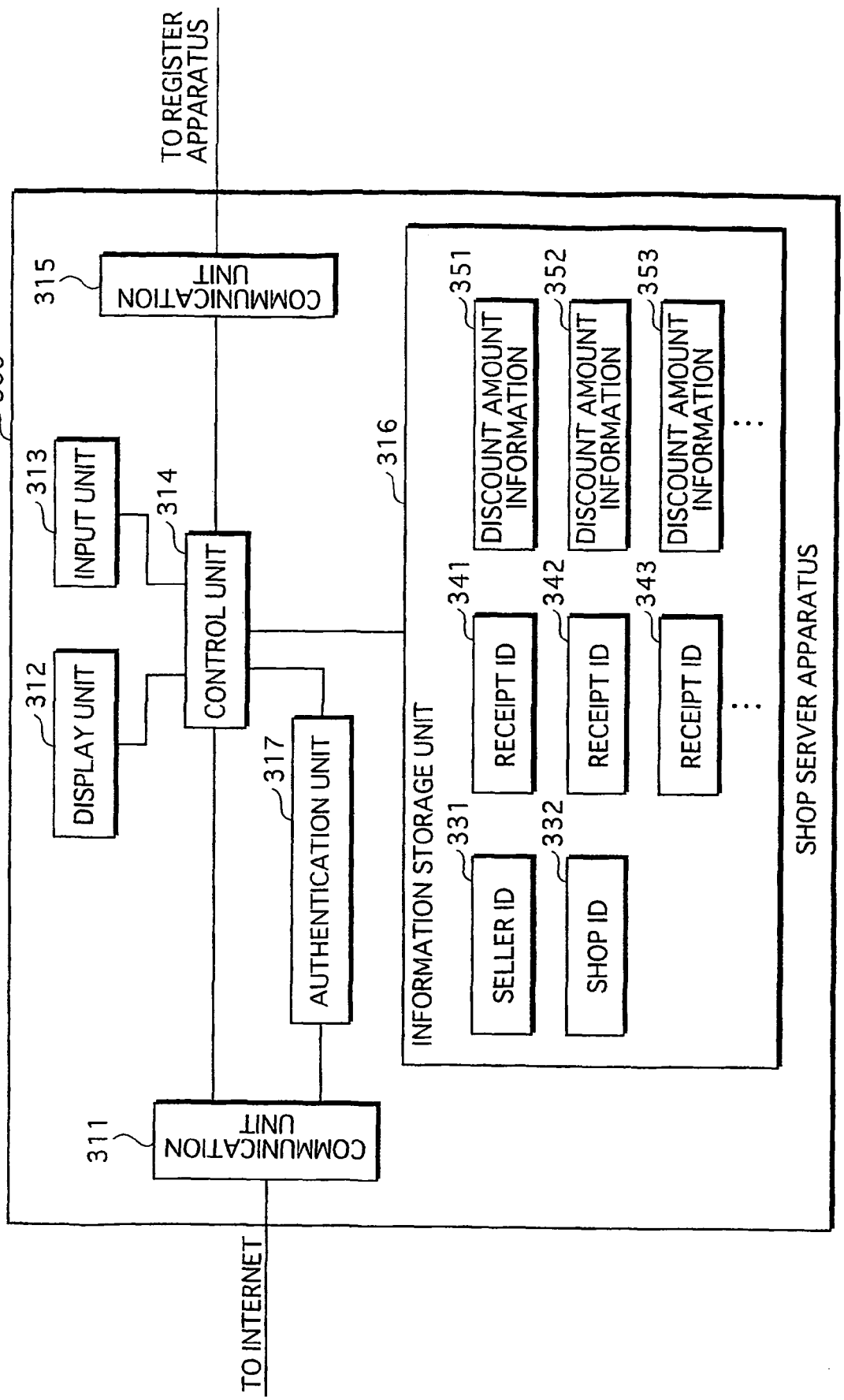
FIG. 9 is a block diagram showing the structure of a shop server apparatus 300.

The shop server apparatus 300, as shown in FIG. 9, is composed of a communication unit 311, a display 312, an input unit 313, a control unit 314, a communication unit 315, an information storage unit 316, and an authentication unit 317.

The shop server apparatus 300 is a computer system similar to the distribution server 600. Specifically, the shop server 300 is composed of a microprocessor, a ROM, a RAM, and so on, and achieves part of its functions by the microprocessor operating according to a computer program.

(1) Information Storage Unit 316

The information storage unit 316, as one example shown in FIG. 9, stores a seller ID 331, a shop ID 332, pieces of receipt information including receipt information 341, 342, and 343, and pieces of discount amount information including discount amount information 341, 342, and 343. The pieces of receipt information including receipt information 341, 342, and 343, are stored in correspondence with the pieces of discount amount information including discount amount information 341, 342, and 343.

The seller ID 331 is identification information that identifies the retail sales company that manages the shop 51 in which the shop server apparatus 300 is located.

The shop ID 332 is identification information that identifies the shop 51 in which the shop server apparatus 300 is located.

The receipt information 341, 342, 343, and so on are each generated by one of the register apparatuses 200, 201 and so on. The receipt information is as described earlier, and therefore is not described here.

The discount amount information 351, 352, 353, and so on are each generated by one of the IC cards 100, 101, and so on, and received by one of the register apparatuses 200, 201, and so on. The discount amount information is as described earlier, and therefore is not described here.

(2) Communication Unit 311

The communication unit 311 transmits and receives information between the control unit 314 and an external apparatus connected via the Internet 23, under the control of the control unit 314.

(3) Display Unit 312, Input Unit 313

The display unit 312 displays various information, under control of the control unit 314.

The input unit 313 receives an operation from the user, and outputs instruction information corresponding to the received operation to the control unit 314.

(4) Control Unit 314

<Processing for Transfer From the Register Apparatus 200>

When the shop 51 has finished business for the day, all receipt information and discount amount information stored in the register apparatus 200 is transferred to the shop server 300. The following describes transfer of the receipt information and discount amount information from the register apparatus 200 to the shop server 300.

The control unit 314 receives the receipt information via the communication unit 316, and writes the received receipt information to the information storage unit 316.

Furthermore, the control unit 314 receives the discount amount information via the communication unit 315, and writes the received discount amount information to the information storage unit 316.

In this way, all receipt information and discount amount information stored in the register apparatus 200 is transferred to the shop server apparatus 300.

<Discount Amount Information Settlement Processing>

When the shop 52 is the bearer of a discount of the regular selling price of a commodity, and the commodity is sold at the shop 51, in other words at a shop other than the shop 52, the shop 52 pays an amount equivalent to the discount amount to the shop 51. This kind of payment between the shop 51 and the shop 52 is called settlement of the discount amount. Similarly, when a shop A is the bearer of a discount of the regular selling price of a commodity, and the commodity is sold at a shop B, in other words at a shop other than the shop A, the shop A pays an amount equivalent to the discount amount to the shop B. Furthermore, when the manufacturer is the bearer of a discount of the regular selling price of a commodity, and the commodity is sold by the retail sales company which is separate from the manufacturer, the manufacturer pays an amount equivalent to the discount amount to the retail sales company.

<Transfer from the Shop Server Apparatus 300 to Another Shop Server Apparatus>

The following describes transfer of discount amount information from the shop server apparatus 300 to another shop server apparatus is described as one example of settlement of the discount amount between the shop 51 and the shop 52.

Note that it is assumed here that the all receipt information and discount amount information is transferred from the register apparatus 200 to the shop server apparatus 300 after the shop 51 has finished business for the day. This also applies to the other shop server apparatuses.

The control unit 314 reads the seller ID 332 from the information storage unit 316.

Next, the control unit 314 performs the following processing for each piece of discount amount information stored in the information storage unit 314.

1) The control unit 314 reads one piece of discount amount information from the information storage unit 316.

2) The control unit 314 compares the read shop ID 332 with the bearer ID included in the read discount amount information, and when the two match, returns to 1).

When the two do not match, the control unit 314 determines where the discount amount information is to be transferred (in other words, the transfer destination), with use of the bearer ID. Specifically, the control unit 314 stores in advance a transfer destination table that includes a plurality of pieces of transfer destination information, each of which corresponds to a bearer ID and a URL that indicates a transfer destination. The control unit 314 determines the transfer destination by extracting the URL corresponding to the bearer ID included in the discount information.

3) The control unit 314 controls the authentication unit 317 so as to perform device authentication and mutual key sharing between the shop server apparatus 300 and the apparatus of the transfer destination. Specifically, the device authentication and key sharing are performed between the authentication unit 317 of the shop server apparatus 300 and an authentication unit of the transfer destination apparatus. Note that device authentication and key sharing are as described earlier. Furthermore, the transfer destination apparatus is assumed here to be the shop server apparatus 301.

4) When device authentication by the authentication unit 317 is successful, the control unit 314 encrypts the read piece of discount amount information, with use of the session key K generated by the authentication unit 317, and thereby generates encrypted discount amount information. The control unit 314 then applies a digital signature to the discount amount information, thereby generating signature data, and transmits the generated encrypted discount information and the generated signature data to the shop server apparatus 301. Next, the control unit 314 deletes the piece of discount amount information from the information storage unit 316. Note that the discount amount information may be updated so that the bearer ID is blank.

<Transfer from Another Shop Server Apparatus to the Shop Server Apparatus 300>

The following describes transfer of discount amount information from another server apparatus to the shop server apparatus 300, as one example of discount amount settlement between the shop 51 and the shop 52.

The control unit 314 receives encrypted discount amount information and signature data, and decrypts the received encrypted discount amount information with use of the session key K' generated by the authentication unit 317, thereby generating discount amount information.

Next, the control unit 314 performs verification of the signature information of the discount amount information, and if verification succeeds, stores the generated discount amount information. If verification fails, the settlement processing ends.

In this way, settlement is performed by transferring discount amount information to the party indicated by the bearer ID included in the discount amount information.

Operations for settlement between any of the shop server apparatuses and the manufacturer server apparatus 400 are the same as described above.

(5) Communication Unit 315

The communication unit 315 transmits and receives information between the register apparatus 200 and the control unit 314, under the control of the control unit 314.

(6) The authentication unit 317 is identical in structure to the authentication unit 219, and therefore is not described here.

1.6 Manufacturer Server Apparatus 400

Figure 10:
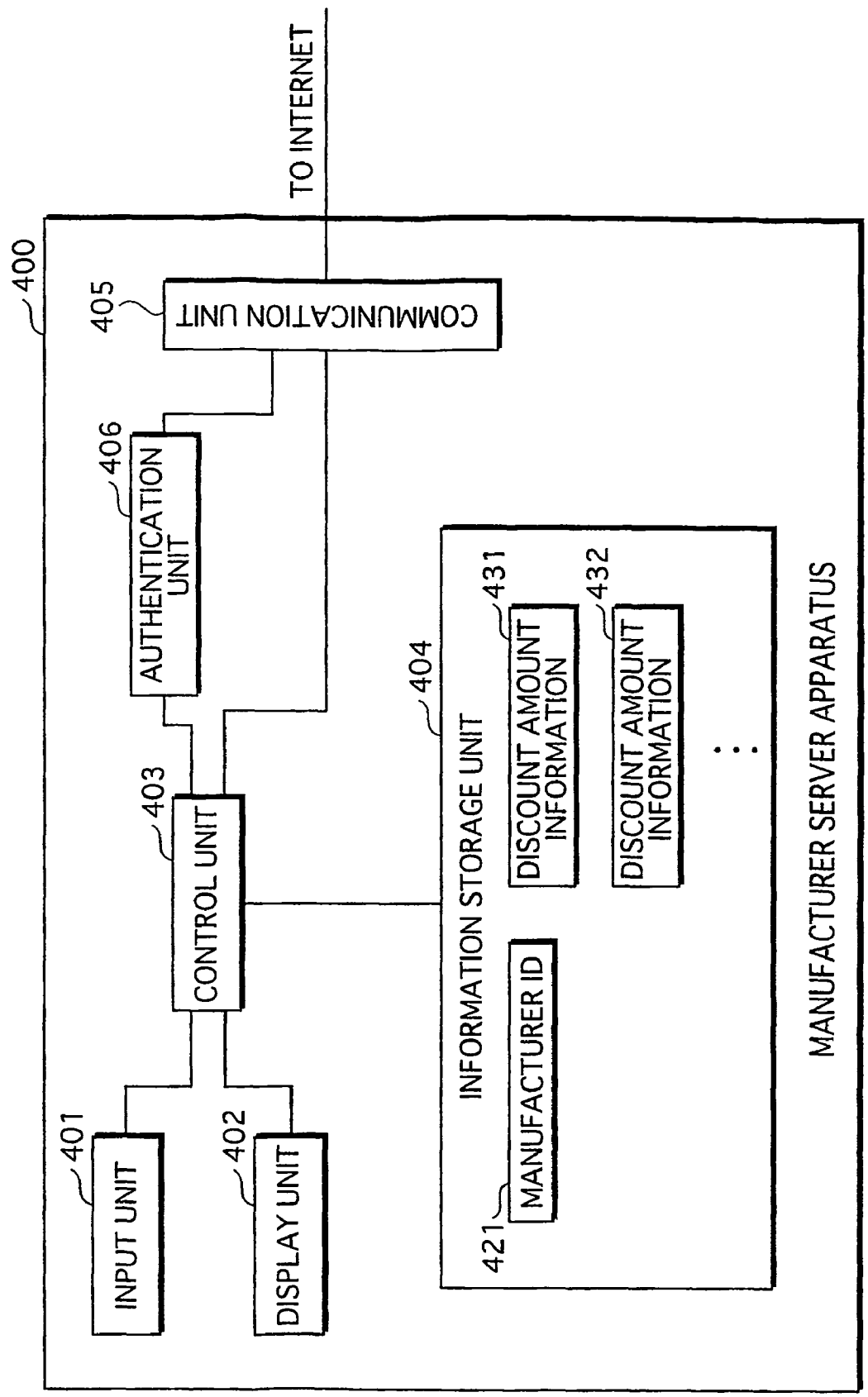
FIG. 10 is a block diagram showing the structure of a manufacturer server apparatus 400.

The manufacturer server apparatus 400, as shown in FIG. 10, is composed of an input unit 401, a display unit 402, a control unit 403, an information storage unit 404, a communication unit 405, and an authentication unit 406.

The manufacturer server apparatus 400 is a computer system similar to the distribution server apparatus 600. Specifically, the manufacturer server apparatus 400 is composed of a microprocessor, a ROM, a RAM, and the like, and achieves part of its functions by the microprocessor operating according to a computer program.

(1) Information Storage Unit 404

The information storage unit 404, as shown in one example in FIG. 10, stores a manufacturer ID 421, and pieces of discount amount information including discount amount information 431 and 432.

The manufacturer ID 421 is identification information that identifies a manufacturer who possesses the manufacturer server 400.

Each of the discount amount information 431, 432 and so on is generated by one of the IC cards 100, 101, 102, 103 and so on, and has been received via one of the register apparatuses 200, 201, 202, 203, and so on, one of the shop server apparatuses 300, 301, and so on, and the Internet 23. The discount amount information is as described earlier, and therefore is not described here.

(2) Input Unit 401 and Display Unit 402

The input unit 401 receives an operation from an operator, and outputs instruction information corresponding to the received instruction to the control unit 403.

The display unit 402 displays various information under the control of the control unit 403.

(3) Control Unit 403

The control unit 403 performs transfer of discount amount information between the manufacturer server apparatus 400 and another apparatus in the same way as the control unit 314 of the shop server apparatus 300.

(4) Communication Unit 405

The communication unit 405 transmits and receives information between the control unit 403 and another apparatus connected via the Internet 23, under the control of the control unit 403.

(5) Authentication Unit 406

The authentication unit 406 is identical in structure to the authentication unit 219, and therefore is not described here.

1.7 Personal Computer 700

Specifically, the personal computer 700 is a computer system composed of a microprocessor, a ROM, a RAM, a hard disk unit, a display unit, a keyboard, a mouse, an IC card input/output unit, and so on. A computer program is stored in the hard disk unit, and the personal computer 700 achieves its functions by the microprocessor operating according to the computer program.

The computer program includes household account management software for managing the household accounts of the user.

When the IC card 100 is loaded in the personal computer 700 by the user and an operation to start the household accounts management software is performed by the user, by operating according to the household accounts management software the personal computer 700 reads the receipt information from the IC card 100 via the IC card input/output unit, and makes use of the read receipt information for managing household accounts.

1.8 Operations in the Sales System 10

The following describes operations in the sales system 10.

The following describes, with use of the flowcharts in FIGS. 11 to 14, operations in the sales system 10 when a user purchases commodities, and in particular operations by the IC card 100 and the register apparatus 200.

The barcode reader 211 of the register apparatus 200 reads the commodity ID identifying the commodity from the barcode attached to the packaging of the commodity, according to an operation by the operator, and outputs the read commodity ID to the control unit 215. Furthermore, the input unit 212 receives input of the number of units of the commodity from the operator, and outputs the input number of units to the control unit 215 (step S101).

Next, the control unit 215 receives the commodity ID and the number of units from the barcode reader 211 and the input unit 212 respectively, reads the commodity information that includes the received commodity ID from the commodity information table 251, extracts the unit price from the read commodity information, and multiplies the extracted unit price with the received number of units, thereby obtaining the total price of commodities (step S102). Next, until receiving finish information indicating that input of commodities has finished from the input unit 212 (step S103), the control unit 215 returns to step S101 and repeats the processing.

Next, on receiving finish information indicating that input of the commodities being purchased has finished from the input unit 212 (step S103) and the input unit 212 receiving input indicating whether or not an IC card is to be used to receive a receipt, when the received input indicates that an IC card is not to be used (step S104), the register apparatus 200 receives cash payment (step S105), and ends the processing for selling commodities to the user.

On the other hand, when the input unit 212 receives input indicating that an IC card is to be used (step S104), the control unit 215 generates pre-receipt information composed of a pre-receipt segment, the seller ID stored in the information storage unit 217, the shop ID, a generated receipt ID, the selling time/date (the present date), the register ID stored in the information storage unit 217, commodity selling information generated based on read commodity information and calculated total price of commodities, and an overall total amount which is the total amount of all total prices of commodities (step S106).

The control unit 215 of the register apparatus 200 then controls the authentication unit 219 so as to perform mutual device authentication and key sharing with the IC card 100, and the IC card 100 controls the authentication unit 112 so as to perform mutual device authentication and key sharing with the register apparatus 200. The authentication unit 219 and the authentication unit 112 perform mutual device authentication and key sharing (step S107).

When authentication by the authentication unit 219 fails (step S108), the control unit 215 controls so that the register apparatus 200 receives cash payment (step S109), and the register apparatus 200 then ends processing for selling a commodity to the user.

Furthermore, when authentication by the authentication unit 112 fails (step S110), the IC card 110 ends transmission and reception of information with the register apparatus 200.

When authentication by the authentication unit 219 succeeds (step S108), the control unit 215 receives the session key K from the authentication unit 219, and applies an encryption algorithm E1 to generated pre-receipt information, with use of the received session key K, thereby generating encrypted pre-receipt information (step S111). The control unit 215 then outputs the generated encrypted pre-receipt information to the IC card 100 via the communication unit 218 (step S112).

Furthermore, when authentication by the authentication unit 112 succeeds (step S110), the control unit 113 of the IC card 100 receives encrypted pre-receipt information from the register apparatus 200 via the communication unit 111 (step S112). The control unit 113 receives the session key K', applies the decryption algorithm D1 to the received encrypted pre-receipt information, with use of the received session key K', thereby generating encrypted pre-receipt information (step S113), and writes the generated pre-receipt information to the pre-receipt area 121 of the information storage unit 115 (step S115).

Meanwhile, the input unit 212 of the register apparatus 200 receives input of whether payment is to be either with-discount payment or without-discount payment, and outputs discount payment information indicating either with-discount payment or without-discount payment to the control unit 215 (step S114). Furthermore, the input unit 212 outputs the discount payment information to the IC card 100 via the communication unit 218 (step S116).

When the control unit 215 receives the discount payment information indicating with-discount payment or without-discount payment from the input unit 212, and the received discount payment information indicates without-payment information (step S117), the control unit 215 proceeds to step S131. When the received discount payment information indicates with-discount payment (step S117), the control unit 215 proceeds to step S155.

Furthermore, the control unit 113 of the IC card 100 receives the discount payment information indicating with-discount payment or without-discount payment from the register apparatus 200 via the communication unit 111 (step 116), and when the received discount payment information indicates without-discount payment (step S18), the control unit 113 proceeds to step S136. When the received discount payment information indicates with-discount payment (step S118), the control unit 113 proceeds to step S151.

The following describes operations by the register apparatus 200 and the IC card 100 when a discount is not applied.

The register apparatus 200 receives payment from the user (step S131). The control unit 215 deletes the pre-receipt segment from the generated pre-receipt information, thereby generating receipt information (step S132), and applies the digital signature algorithm SIG to the generated receipt information, thereby generating signature data for the receipt information (step S133), and outputs the generated digital signature and a receipt conversion instruction that instructs conversion of pre-receipt information to receipt information, to the IC card 100 via the communication unit 218 (step S134). Next, the control unit 215 writes the generated receipt information to the information storage unit 217 (step S135).

Meanwhile, the control unit 113 of the IC card 100 receives the digital signature for the receipt information and the receipt conversion instruction from the register apparatus 200 via the communication unit 111 (step S134).

On receiving the receipt conversion information (step S136), the control unit 113 deletes the pre-receipt segment from the pre-receipt information in the pre-receipt area 122, thereby generating receipt information (step S137), and writes the generated receipt information and the received signature data in correspondence to the receipt area 131. At this time the control unit 113 deletes pre-receipt information that is already stored in the pre-receipt area 121 (step S138).

On receiving information other than a receipt conversion instruction (step S136), the control unit 113 performs other processing (step S139).

In this way, receipt information is written to the IC card 100 when a discount is not applied.

The following describes operations by the register 200 and the IC card 100 when a discount is applied.

The control unit 113 of the IC card 100 reads all receipt information 132, 133, 134, and so on from the receipt area 131 (step S151), and reads the pre-receipt information 122 from the pre-receipt area 121 (step S152). The control unit 113 extracts, from among the pieces of commodity selling information in the pre-receipt information 122, those in which the discount flag indicates that a discount is applicable, and then extracts the commodity ID included in each of the extracted pieces of commodity selling information, and reads, from the discount reference area 151, the discount reference information that includes the extracted commodity IDs (step S153). Next, the control unit 113 instructs the discount calculation unit 114 to generate discount information with use of the read receipt information and discount reference information. The discount calculation unit 114 generates discount amount information (step S154).

The control unit 215 of the register apparatus 200 controls the authentication unit 219 so as to perform mutual device authentication and key sharing with the IC card 100, and the control unit 113 of the IC card 100 controls the authentication unit 112 so as to perform mutual device authentication and key sharing with the register apparatus 200. The authentication unit 219 and the authentication unit 112 perform mutual device authentication and key sharing (step S155).

When authentication by the authentication unit 219 fails (step S156), the control unit 215 controls the register apparatus 200 so as to accept cash payment (step S157), and the register apparatus 200 then ends processing for selling commodities to the user.

Furthermore, when authentication by the authentication unit 112 fails (step S158), the IC card 100 ends transmission and reception of information with the register apparatus 200.

When authentication by the authentication unit 112 succeeds (step S158), the control unit 113 receives the session key K' from the authentication unit 112, and applies the encryption algorithm E2 to generated discount amount information with use of the received session key K', thereby generating encrypted discount amount information (step S159). The control unit 113 further applies the digital signature algorithm SIG to the generated discount amount information, thereby generating signature data (step S160), and outputs the generated encrypted discount amount information and the signature data to the register apparatus 200 via the control apparatus 111 (step S161).

Meanwhile, when authentication by the authentication unit 219 of the register apparatus 200 succeeds (step S156), the control unit 215 receives the encrypted discount amount information and the signature data from the IC card 100 via the communication unit 218 (step S161), further receives the session key K from the authentication unit 219, and applies the decryption algorithm D2 to the received encrypted discount amount information using the received session key K, thereby generating discount amount information (step S162). Furthermore, the control unit 215 performs verification of the received signature data, with use of the verification algorithm VFY (step S163). When verification of the signature data fails (step S164), the control unit 215 ends the processing.

When verification of the signature data succeeds (step S164), the control unit 215 calculates the discounted selling price based on the received discount amount information (step S181), and the register apparatus 200 receives money equivalent to the discounted selling price from the user (step S182). The control unit 215 then replaces the pre-receipt information with receipt information, and generates the receipt information by updating the total price of commodities and overall total price included in the receipt information (step S183). In addition, the control unit 215 applies the digital signature algorithm SIG to the generated receipt information, thereby generating signature data (step S184). Next, the control unit 215 outputs a receipt conversion instruction indicating conversion of pre-receipt information into receipt information, to the IC card 100 via the communication unit 218 (step S185).

The control unit 215 then writes the generated receipt information to the information storage area 217 (step S186), and writes the generated discount amount information to the information storage unit 217 (step S187).

Meanwhile, the control unit 113 of the IC card 100 receives the receipt conversion instruction and the signature data for the receipt information from the register apparatus 200 via the communication unit 111 (step S185). When the receipt conversion information is received (step S188), as described earlier, the control unit 113 replaces the receipt information with the pre-receipt information 122 stored in the pre-receipt area 121 (step S189), and writes the receipt information and the signature data for the receipt information in correspondence to the receipt area 131, and the deletes the pre-receipt information 122 from the pre-receipt area (step S190).

When a receipt conversion instruction is not received (step S188), the control unit 113 of the IC card 100 performs other processing (step S191).

In this way, a discount is applied and receipt information is written to the IC card 100.

(2) Operations for Device Authentication and Key Sharing

Figure 15:
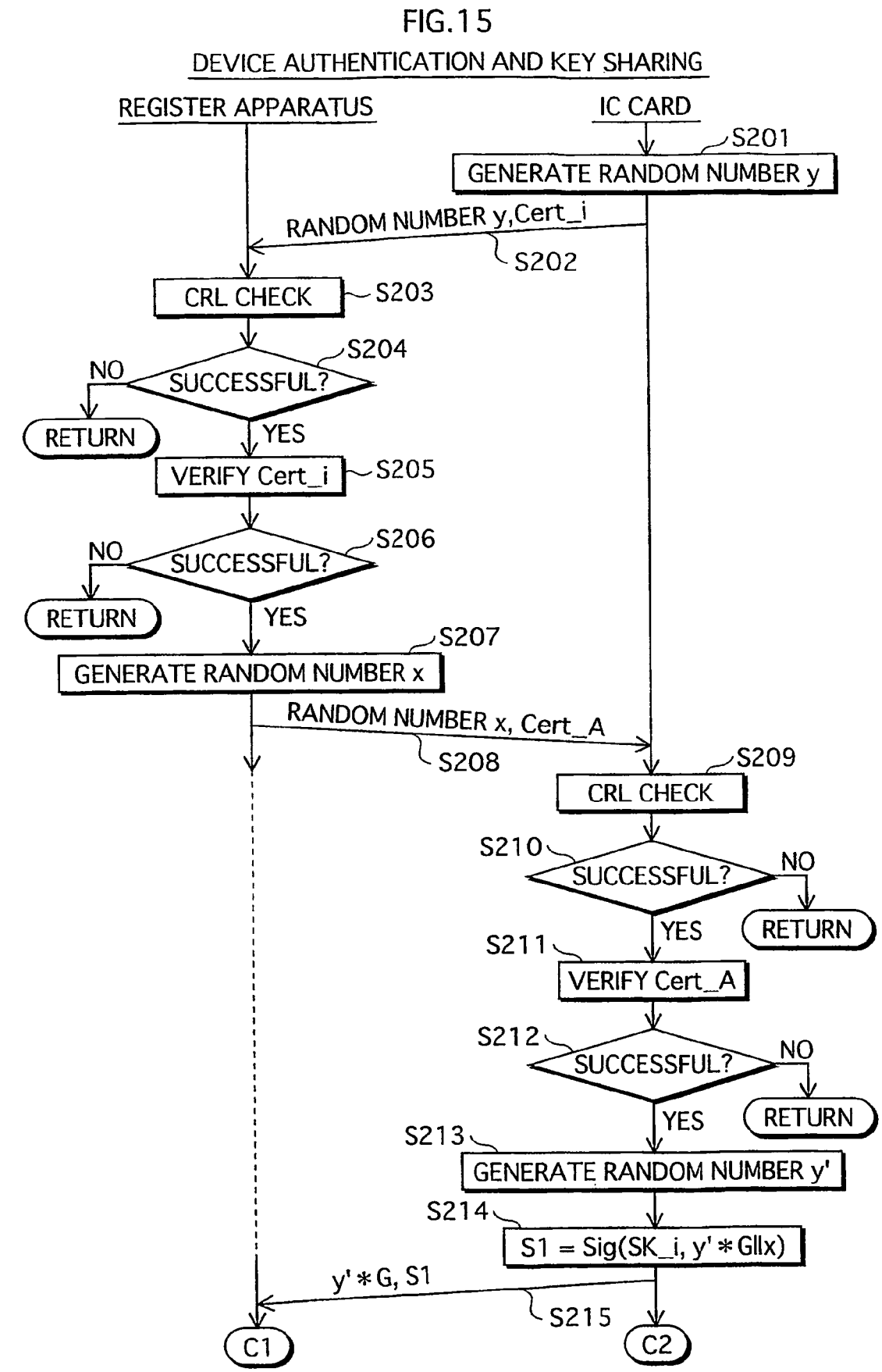
FIG. 15 is a flowchart showing operations for mutual device authentication and key sharing between an authentication unit 291 of the register apparatus 200 and an authentication unit 112 of the IC card 100, and continues in FIG. 16.
Figure 16:
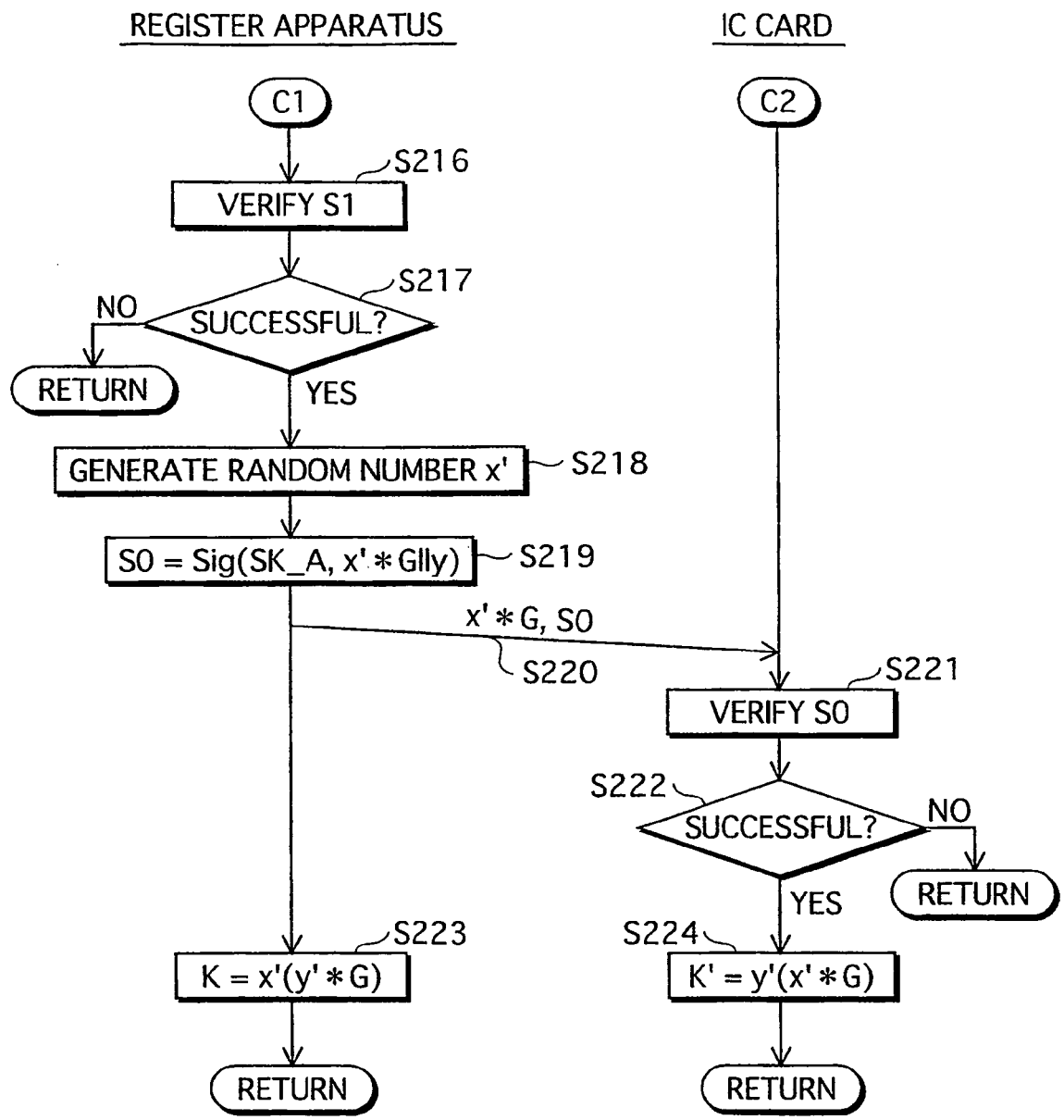
FIG. 16 is a flowchart showing operations for mutual device authentication and key sharing between an authentication unit 291 of the register apparatus 200 and an authentication unit 112 of the IC card 100, and continues from FIG. 15.

Operations for mutual device authentication and key sharing performed by the authentication unit 219 of the register apparatus 200 and the authentication unit 112 of the IC card 100 are described with use of the flowcharts in FIGS. 15 to 16.

Figure 11:
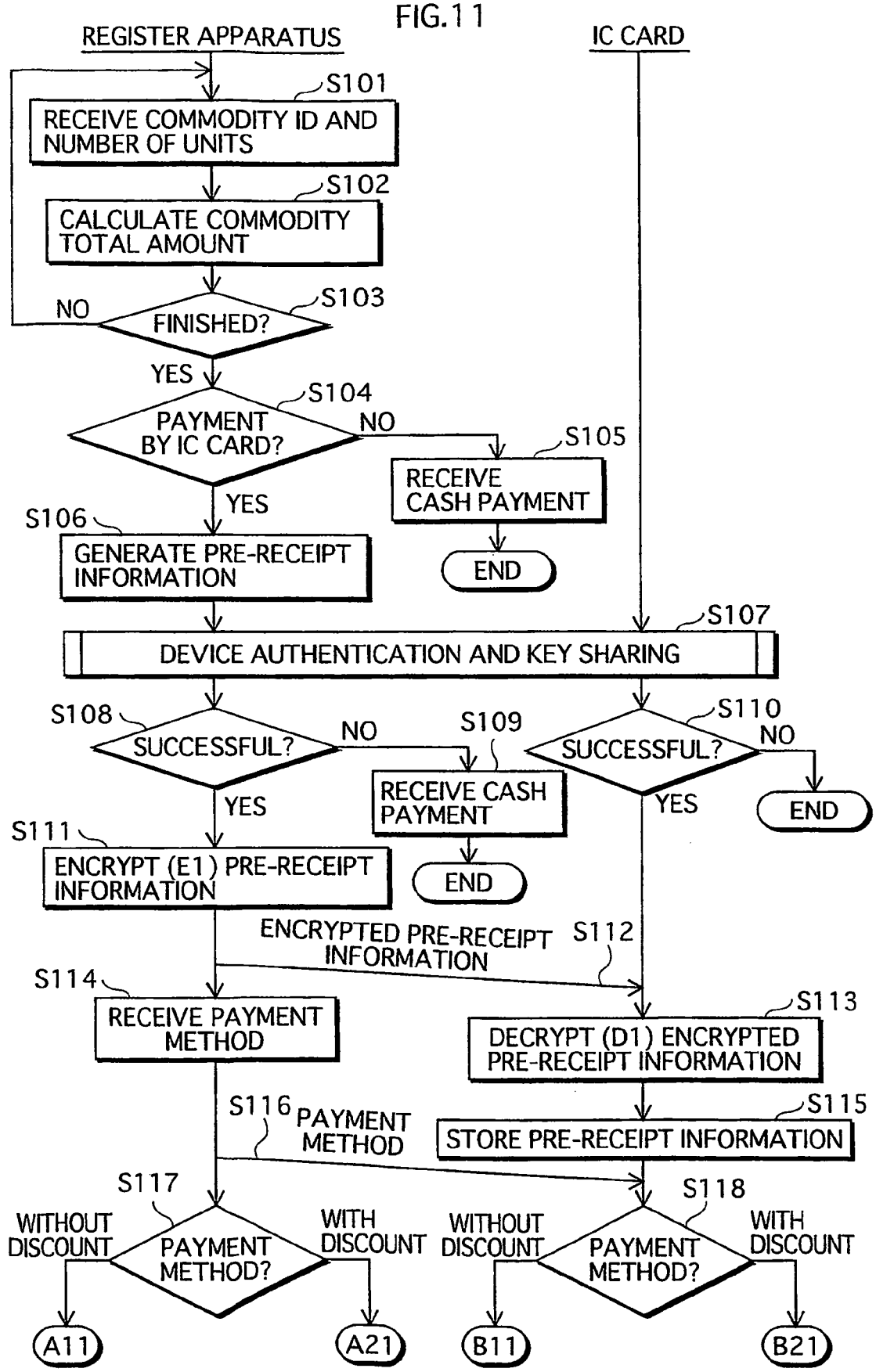
FIG. 11 is a flowchart showing operations of the sales system 10 when a user purchases a commodity, in particular the operations of an IC card 100 and a register apparatus 200, and continues in FIG. 12.
Figure 12:
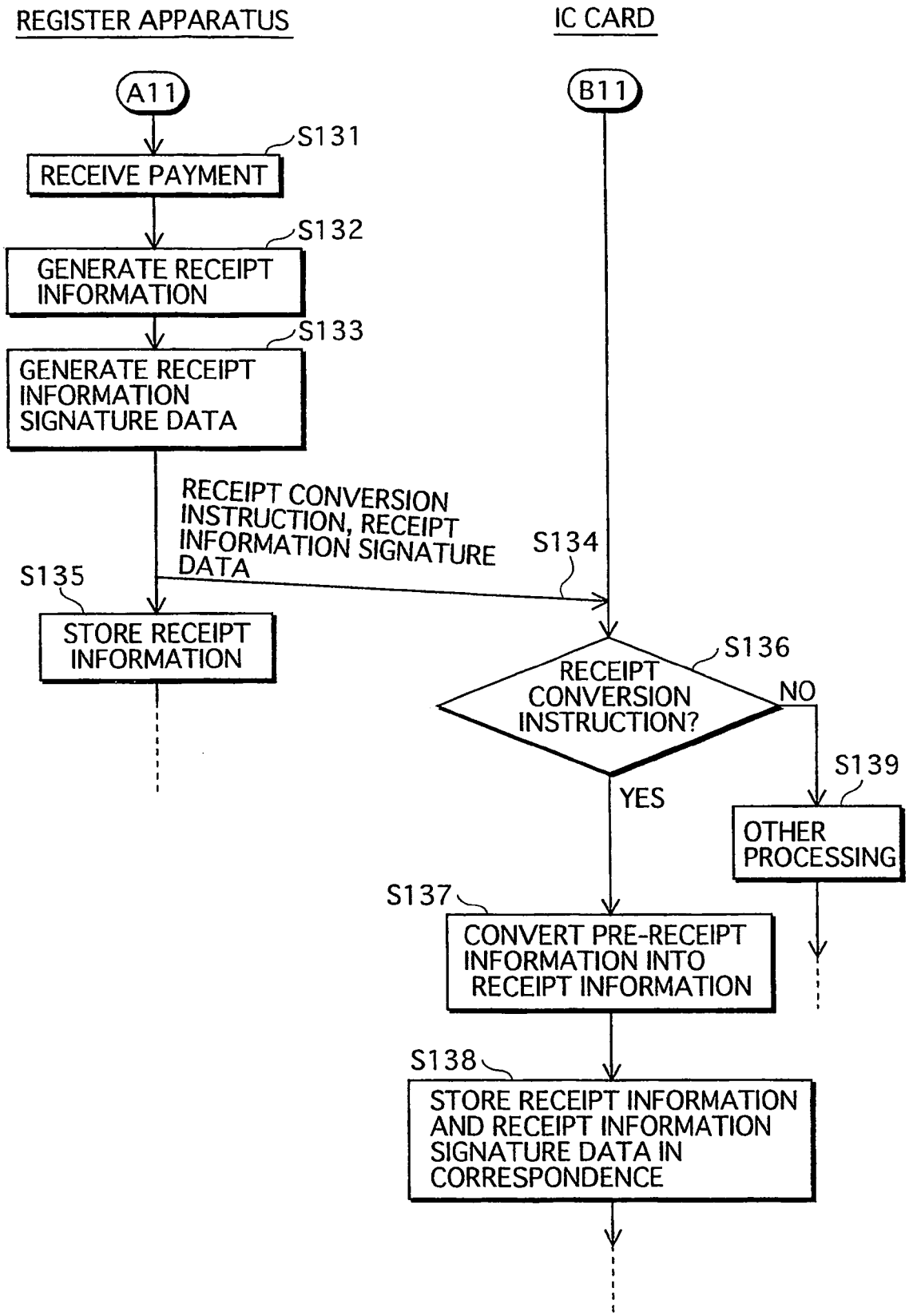
FIG. 12 is a flowchart showing operations of the sales system 10 when a user purchases a commodity, in particular the operations of the IC card 100 and the register apparatus 200, and continues in FIG. 13.
Figure 13:
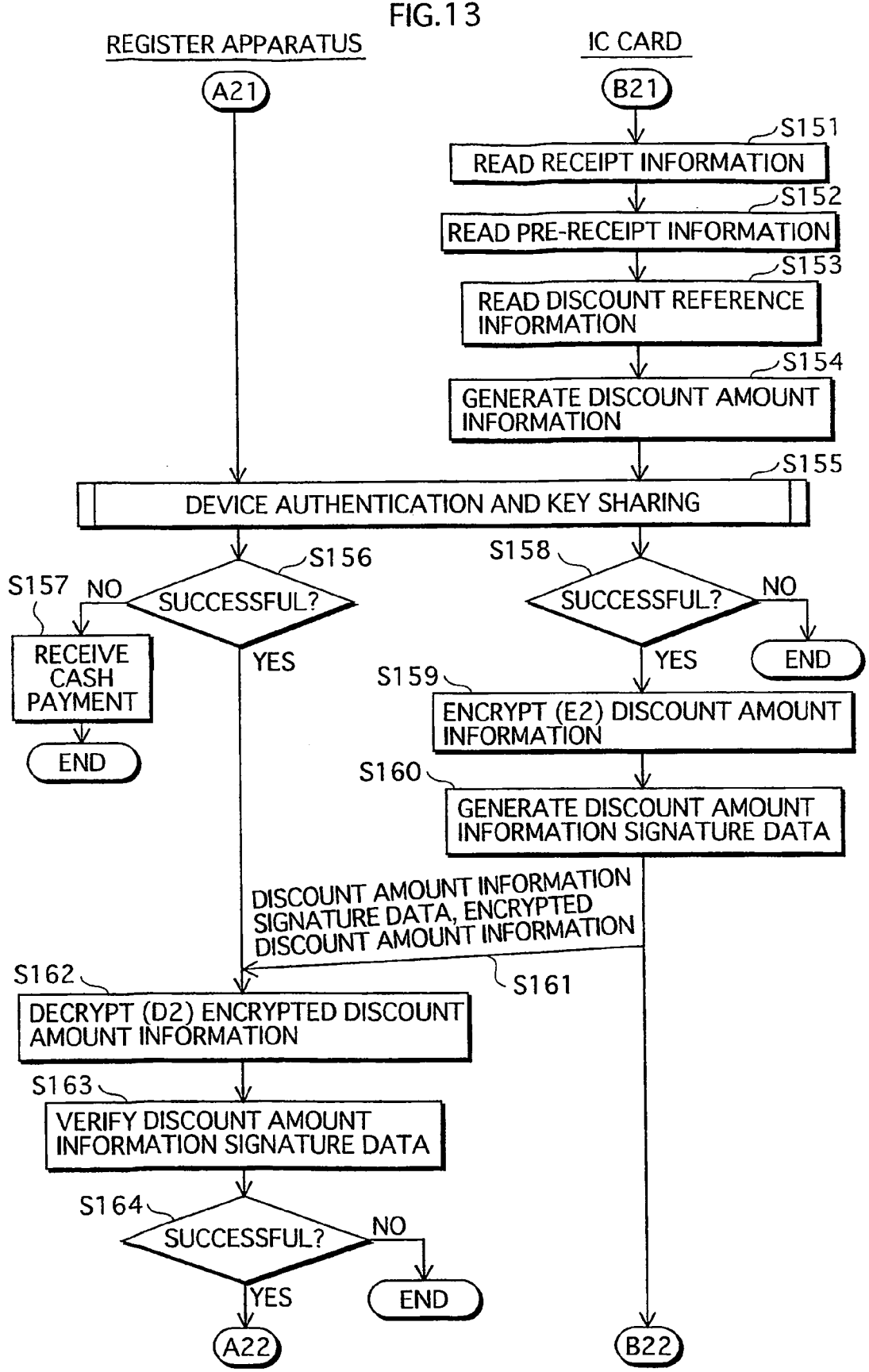
FIG. 13 is a flowchart showing operations of the sales system 10 when a user purchases a commodity, in particular the operations of the IC card 100 and the register apparatus 200, and continues in FIG. 14.
Figure 14:
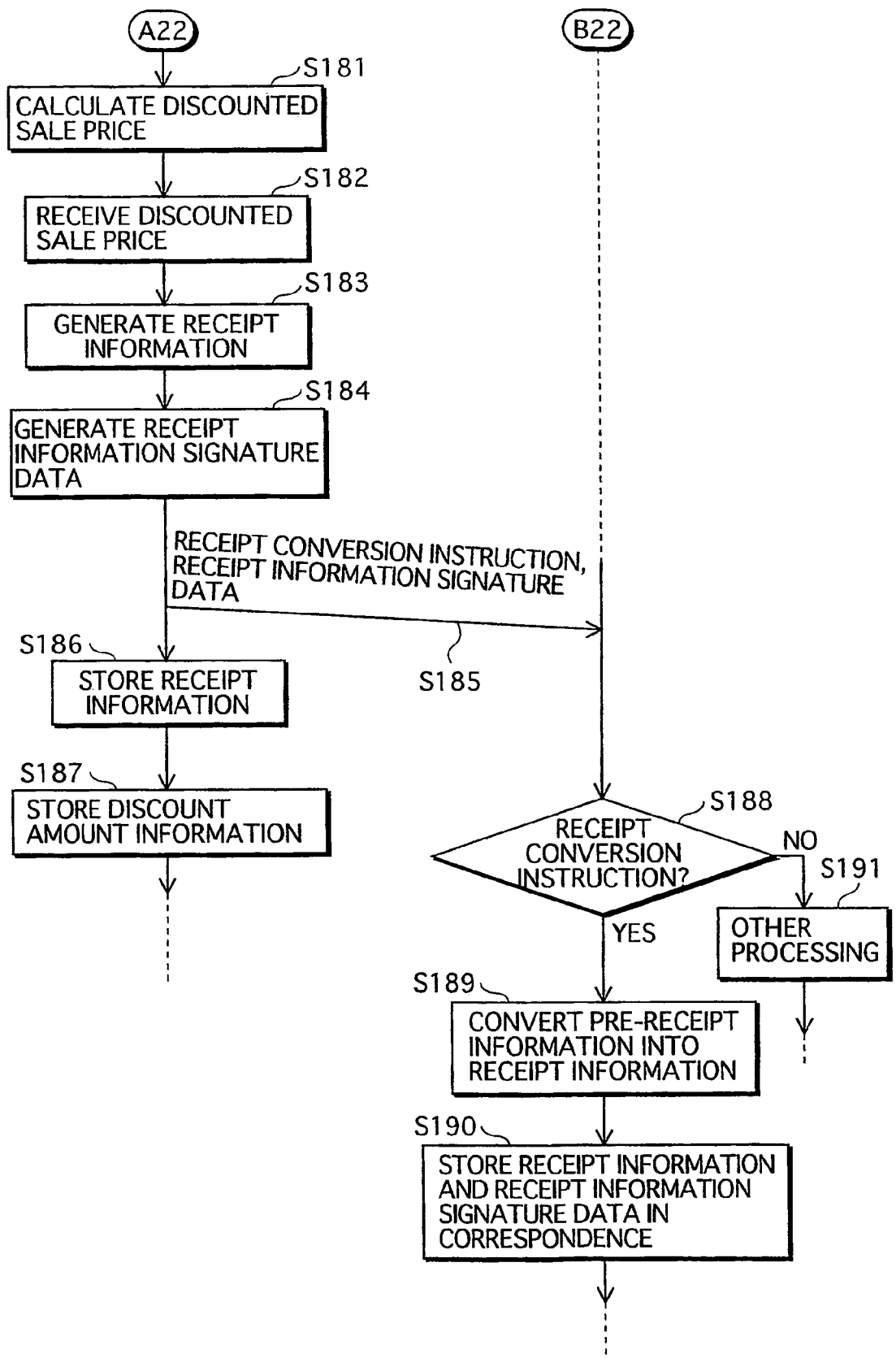
FIG. 14 is a flowchart showing operations of the sales system 10 when a user purchases a commodity, in particular the operations of the IC card 100 and the register apparatus 200, and continues from FIG. 13.

The mutual device authentication and key sharing described here are details of operations at step S107 in FIG. 11, and this description also applies to step S155 of the flowchart in FIG. 13.

The authentication unit 219 of the register apparatus 200 stores in advance a public key PK-CA for a content protection license (CA), a secret key SK-A, and a public key certificate Cert-A, and has an encryption processing sub-unit that performs encryption on an elliptic curve E.

Furthermore, the authentication unit 112 of the IC card 110 stores in advance a public key PK-CA for a content protection license (CA), a secret key SK-i, and a public key certificate Cert-i, and has an encryption processing sub-unit that performs encryption on elliptic curve E.

Furthermore, Sig (SK,D) is an operation for applying a digital signature to data D, with use of a secret key SK.

Furthermore, G is a basepoint on an elliptic curve, and a value unique to the present authentication system.

Here, "*" is an operator showing multiplication on an elliptic curve. For example, "x*G" represents an operation to add a point G on the elliptic curve to itself x times. Furthermore, "||" is an operator expressing concatenation, for example, "A||B" expressing the result of concatenating "A" and "B".

Note that in the following, when references are made to, for example, the authentication unit 219 outputting information to the authentication unit 112, and the authentication unit 112 outputting information to the authentication unit 219, these are abbreviations that respectively express that the authentication unit 219 outputs information to the authentication unit 112 via the communication unit 218 and the communication unit 111, and that the authentication unit 112 outputs information to the authentication unit 219 via the communication unit 111 and the communication unit 218.

The authentication unit 112 generates a random number y (step S201), and outputs the generated random number y and the public key certificate Cert-i to the authentication unit 219 (step S202).

The authentication unit 219 receives the random number y and the public key certificate Cert-i (step S202), and checks whether or not the public key certificate Cert-i of the IC card 100 is revoked, with use of a CRL (Certificate Revocation List) (step S203). When the public key certificate Cert-i is revoked (step S204), the authentication unit 219 ends the processing.

When the public key certificate Cert-i is not revoked (step S204), the authentication unit 219 verifies the public key certificate Cert-i with use of the public key PK-CA (step (S205).

When verification fails (step S206), the authentication unit 219 ends the processing. When verification succeeds (step S206), the authentication unit 219 generates a random number x (step S207), and outputs the generated random number x and the public key certificate cert-A to the authentication unit 112 (step S208).

The authentication unit 112 receives the random number x and the public key certificate Cert-A from the authentication unit 219 (step S208).

Next, the authentication unit 112 checks, with use of the CRL, whether or not the public key certificate Cert-A of the register apparatus 200 is revoked (step S209). When the public key certificate Cert-A is revoked (step S210), the authentication unit 112 ends the processing.

When the public key certificate Cert-A is not revoked (step S210), the authentication unit 112 performs verification of the public key certificate cert-A with use of the public key PK-CA (step S211). When verification fails (S112), the authentication unit 112 ends the processing.

When the verification succeeds (step S212), the authentication unit 112 generates a random number y' (step S213), generates signature data S1=Sig (Sk-i, (y'*G)∥x) (step S214), and outputs y'*G and S1 to the authentication unit 219 (step S215).

The authentication unit 219 receives y'*G and S1 from the authentication unit 112 (step S215).

Next, the authentication unit 219 performs verification of S1 (step S216). When verification fails (step S217), the authentication unit 219 ends the processing. When authentication is successful (step S217), the authentication unit 219 generates a random number x' (step S218), generates signature data S0=Sig (SK-A, (x'*G)∥y) (step S219), and outputs x'*G and S0 to the authentication unit 112 (step S220).

The authentication unit 112 receives x'*G and S0 from the authentication unit 219 (step S220), and performs verification of S0 (step S221). When verification fails (step S222), the authentication unit 112 ends the processing.

When the verification succeeds (step S222), the authentication unit 112 calculates session key K'=y' (x'*G) (step S223).

Meanwhile, the authentication unit 219 calculates the session key K=x' (y'*G) (step S224).

In this way, mutual device authentication and key sharing are performed between the register apparatus 200 and the IC card 100. The session keys K and K' are keys that are identical in value and that are shared by the register apparatus 200 and the IC card 100.

(3) Operations for Transfer of Receipt Information and Discount Amount Information When the shop 51 has finished business for the day, all receipt information and discount amount information stored in the register apparatus 200 is transferred to the shop server 300. The following describes operations for transfer of the receipt information and discount amount information from the register apparatus 200 to the shop server 300, with use of the flowchart in FIG. 17.

The control unit 215 of the register apparatus 200 reads the receipt information from the information storage unit 217, one piece at a time (step S241), and, if not finished reading (step S242), transmits the read receipt information to the shop server 300 via the communication unit 216 (step S243). The control unit 215 then returns to step S241, and repeats the described processing until finishing reading the receipt information.

Meanwhile, the control unit 314 of the shop server apparatus 300 receives the receipt information via the communication unit 315 (step S243), and writes the received receipt information to the information storage area 316 (step S244).

When finished reading the receipt information (step S242), the control unit 215 reads the pieces of discount amount information from the information storage unit 217, one at a time (step S245), and if not finished reading (step S246), transmits the read discount amount information to the shop server apparatus 300 via the communication unit 216 (step S247). The control unit 215 then returns to step S245, and repeats the described processing until finishing reading the discount amount information.

Meanwhile, the control unit 314 of the shop server apparatus 300 receives the discount amount information via the communication unit 315 (step S247), and writes the received discount amount information to the information storage unit 316 (step S248).

After transfer has finished (step S246), the control unit 215 deletes all receipt information and discount amount information from the information storage unit 217 (step S249).

In this way, all the receipt information and discount amount information stored in the register apparatus 200 is transferred to the shop server apparatus 300.

(4) Operations for Discount Amount Settlement

When the shop 52 is the bearer of a discount of the regular selling price of a commodity, and the commodity is sold at the shop 51, in other words at a shop other than the shop 52, the shop 52 pays an amount equivalent to the discount amount to the shop 51.

Figure 18:
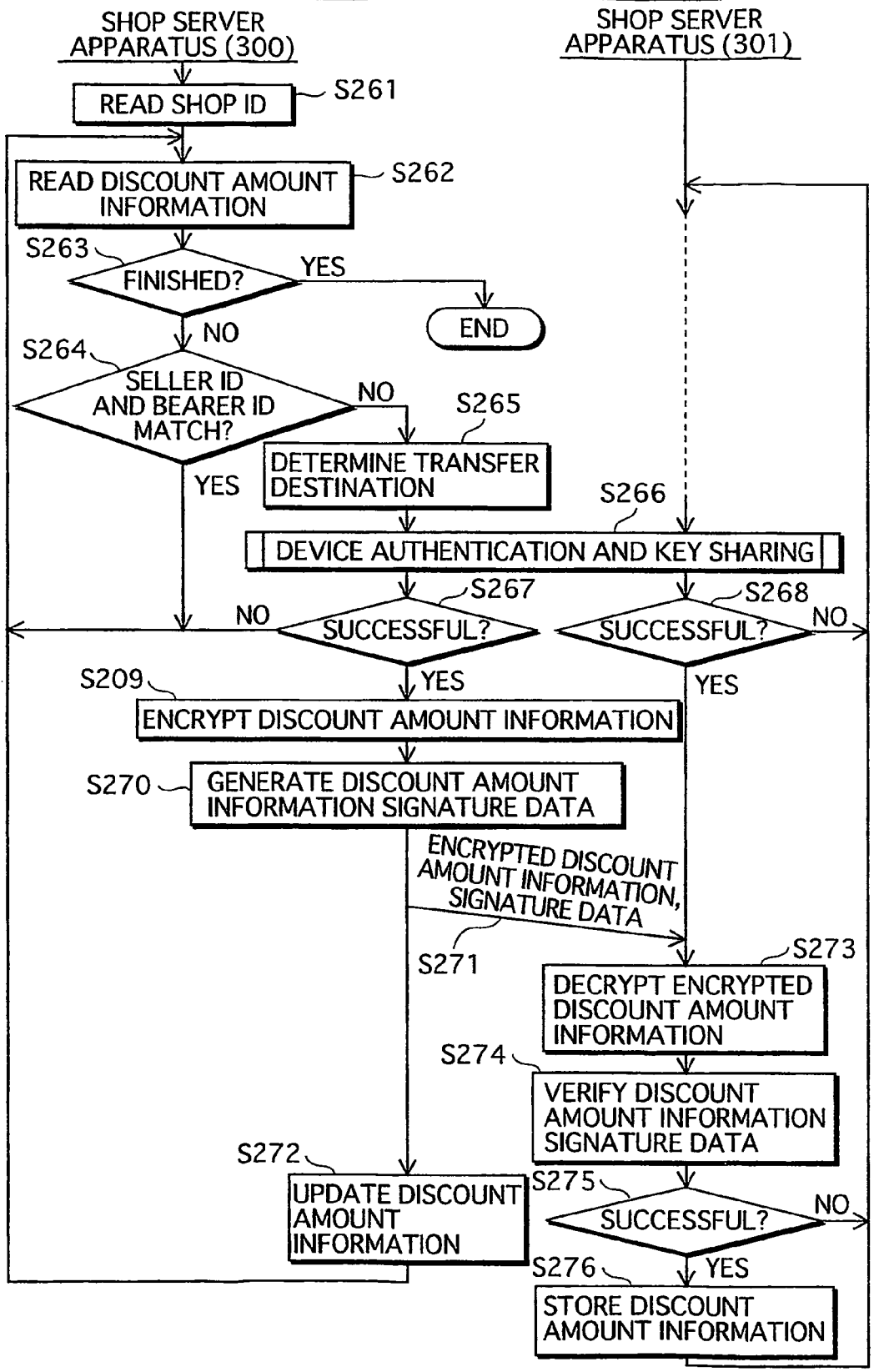
FIG. 18 is a flowchart showing operations by shop server apparatuses 300 and 301 for settling discount amount information.

The following describes operations for settlement by the shop server apparatuses 300 and 301, as one example of settlement of the discount amount between the shop 51 and the shop 52, with use of the flowchart in FIG. 18.

Figure 17:
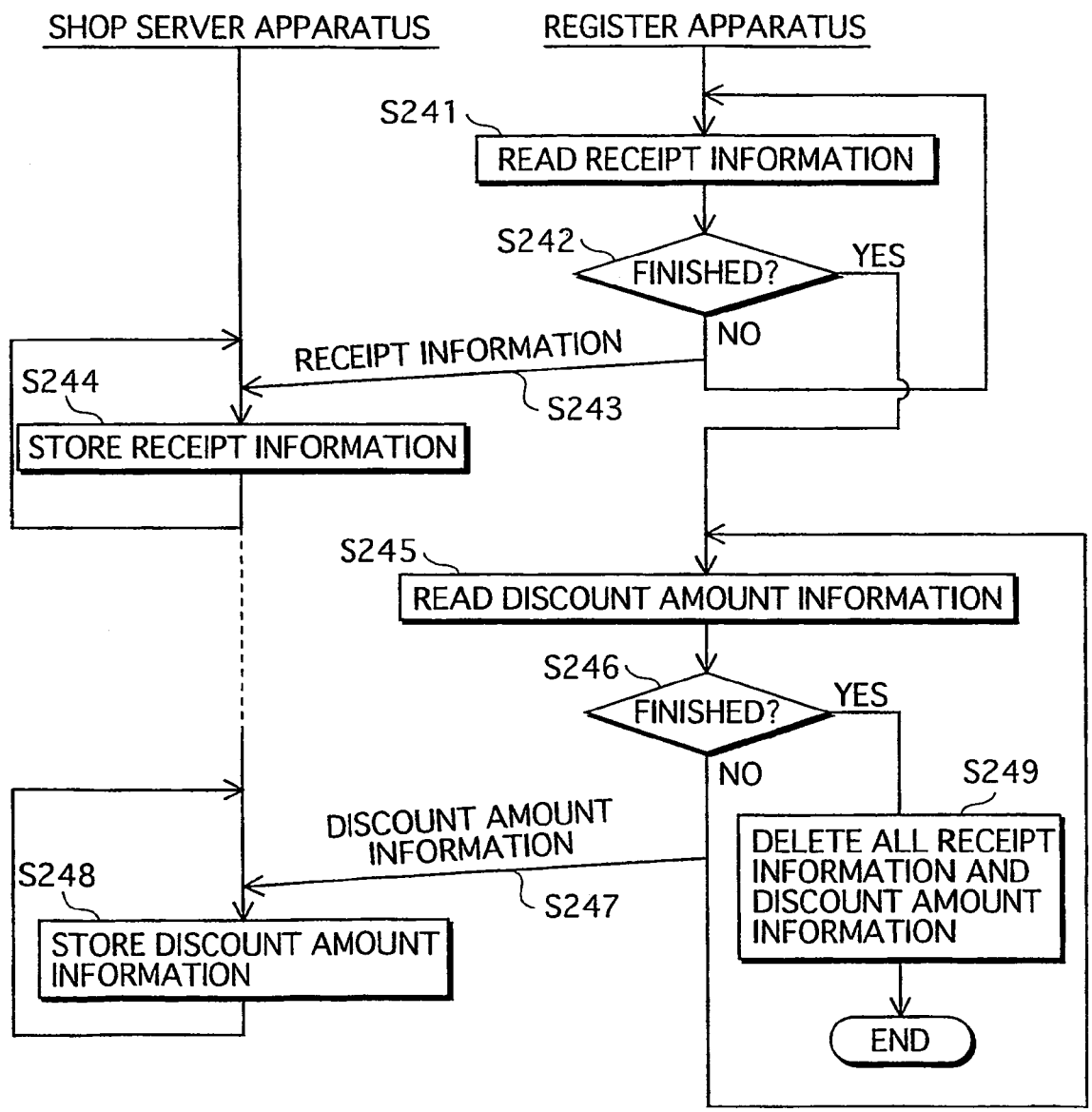
FIG. 17 is a flowchart showing operations for transferring receipt information and discount amount information from the register apparatus 200 to the shop server apparatus 300.

When the shop 51 has finished business for the day, all receipt information and discount amount information stored in the register apparatus 200 is transferred to the shop server 300, as shown by the flowchart in FIG. 17. Here, it is assumed that operations for transferring receipt information and discount amount information from the all register apparatuses to the shop server apparatus 300 have been completed. This is the same for the shop server apparatus 301.

The control unit 314 of the shop server apparatus 300 reads the shop ID 332 from the information storage unit 316 (step S261).

Next, the control unit 314 reads the pieces of discount amount information from the information storage unit 316, one piece at a time (step S263), and ends operations for settlement.

When not finished reading (step S263), the control unit 314 compares the read shop ID 332 with the bearer ID included in the read discount amount information, and when the two match (step S264), returns to step S262 and repeats the processing.

When the two do not match (step S264), the control unit 314 determines the transfer destination of the discount amount information, with use of the bearer ID. Specifically, the control unit 314 stores in advance a transfer destination table that includes a plurality of pieces of transfer destination information, each of which includes a bearer ID and a URL indicating a transfer destination, in correspondence. The control unit 314 determines the transfer destination by extracting the URL corresponding to the user ID included in the discount amount information from the transfer destination table (step S265).

Next, device authentication and key sharing are performed between the shop server apparatus 300 and the apparatus that is the transfer destination. Specifically, the authentication unit 317 of the shop server apparatus 300 and the authentication unit of the shop server apparatus 301 perform device authentication and key sharing. Note that it is assumed here that the transfer destination apparatus is the shop server apparatus 301 (step S266).

When device authentication in the shop server apparatus 300 fails (step S267), the shop server apparatus 300 returns to step S262 and repeats the processing.

When device authentication in the shop server apparatus 301 fails (step S268), the shop server apparatus 300 ends processing for settlement.

When device authentication in the shop server apparatus 300 succeeds (step S267), the control unit 314 encrypts read discount amount information with use of the session key K generated by the authentication unit 317, thereby generating encrypted discount amount information (step S269), applies a digital signature to the discount amount information, thereby generating signature data (step S270), and transmits the generated encrypted discount amount information and the generated signature data to the shop server 301 (step S271). Next, the control unit 314 deletes the discount amount information from the information storage unit 316. Note that, alternatively, the discount amount information may be updated so that the bearer ID is blank (step S272).

Meanwhile, the shop server apparatus 301 receives the encrypted discount amount information and the signature data (step S271), and decrypts the received encrypted discount amount information with use of the session key K' generated by the authentication unit, thereby generating discount amount information (step S273).

The shop server apparatus 301 performs verification of the signature data of the discount amount information (step S274), and if verification succeeds (step S275), stores the generated discount amount information (step S276). If verification fails (step S275), the shop server apparatus ends the processing for settlement.

In this way, settlement is performed by transferring the discount amount information to the party indicated by the bearer ID in the discount amount information.

In the same way, when a retail selling company A is the bearer of a discount on the regular selling price of a commodity that is sold by a retail selling company B, which is separate from the selling company A, the retail selling company A pays an amount equivalent to the discount amount to the retail selling company B. Furthermore, when the manufacturer is the bearer of a discount on the regular selling price of a commodity that is sold by a retail selling company, which is separate from the manufacturer, the manufacturer A pays an amount equivalent to the discount amount to the retail selling company.

Operations for settlement between shop server apparatuses and operations for adjustment between the shop server apparatus and the manufacturer apparatus 400 are the same as described above, and therefore are not described here.

2. Conclusion

As has been described, receipt information for a particular period of time, for example one week or one month, is stored on the IC card, and when the user subsequently purchases a same commodity, the regular selling price of the commodity is discounted. Therefore, the user is able to take advantage of new incentives, and the incentive provider is able to obtain the loyalty of the user with the new incentives.

Furthermore, since the IC card calculates the discount amount itself, it is unnecessary for other parties to be informed of what the user purchases. For example, if the discount amount was to be calculated by the register apparatus using the receipt information, the user must notify the register apparatus, i.e., an apparatus held by another party, of personal information. In contrast, the present invention does not require notification of personal information to other parties, and therefore protects the user's privacy.

Although the present invention has been described based on the above embodiment, the present invention is not limited to the embodiment. Cases such as the following are included in the present invention.

(1) When transmitting discount calculation information to the mobile telephone 500, the distribution server apparatus 600 is not limited to transmitting the discount calculation information via the communication unit 604, the Internet 23, the telephone network 22, and the wireless base station 21 in response to a request from the mobile telephone 500.

Instead the distribution server apparatus 600 may, for example, transmit the discount calculation information of its own accord at regular intervals of, for example, once a week or once a month, to the mobile telephone 500 via the communication unit 604, the Internet 23, the mobile telephone network 22, and the wireless base station 21, rather than in response to a request from the mobile telephone 500. Alternatively, the distribution server apparatus 600 may transit discount calculation information each time discount calculation information is newly generated, or updated.

Furthermore, the distribution server apparatus 600 may transmit discount calculation information to the IC card 100 via the Internet 23, the shop server apparatus and the register apparatus 200 when the user is making a purchase in the shop 51. Alternatively, the register apparatus 200 may store discount calculation information in advance, and transmit this discount calculation information to the IC card 100 when the when the user is making a purchase in the shop 51.

Furthermore, the distribution server apparatus 600 may divide the discount calculation information into a plurality of blocks, and transmit the discount calculation information one block at a time.

Furthermore, a microwave oven that stores discount calculation information may be located in the shop 51. The microwave oven may transmit the discount calculation information to the IC card 100 when the user uses the microwave oven to heat a packaged meal purchased at the shop 51.

Figure 20:
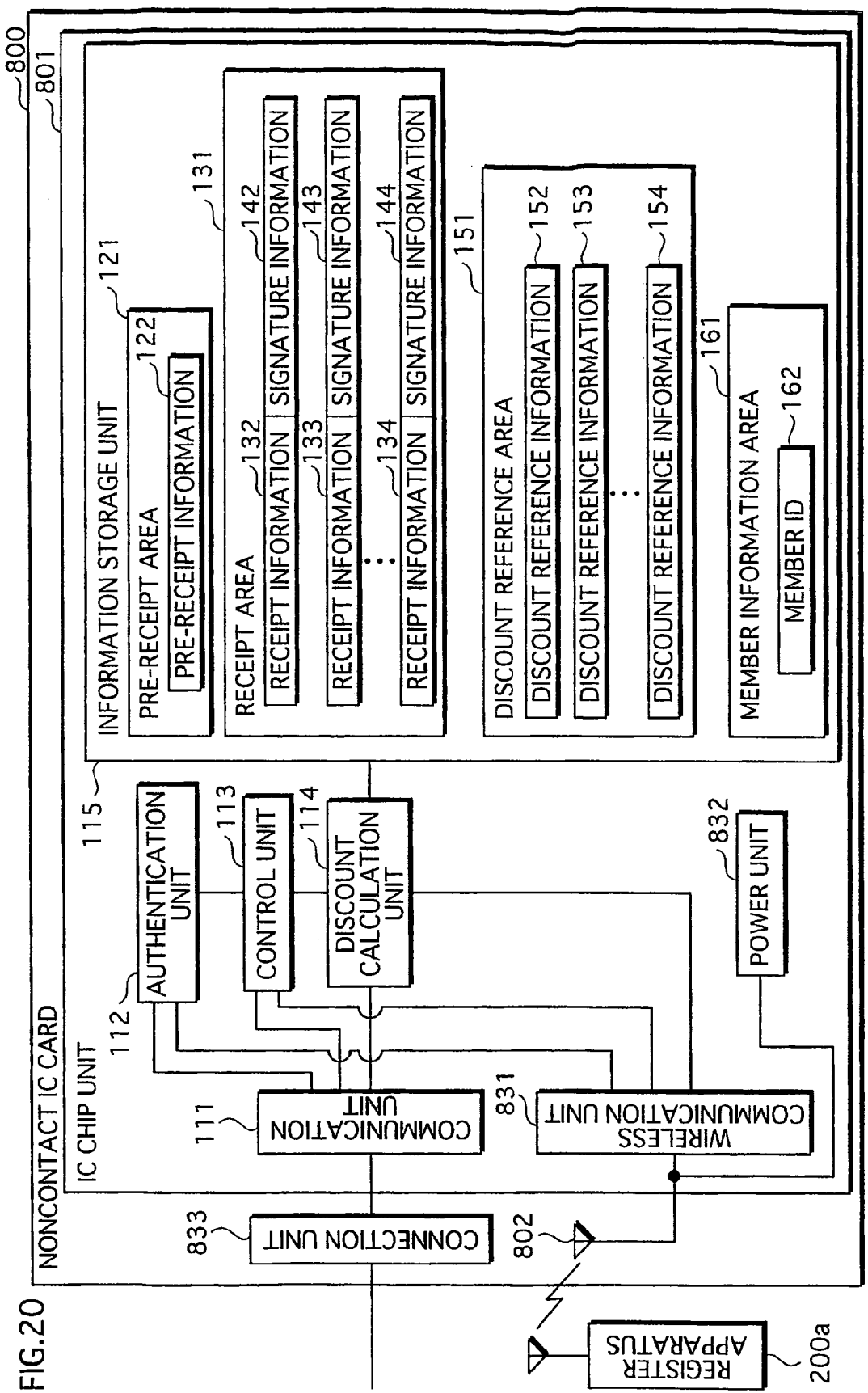
FIG. 20 is a block diagram showing the structure of the noncontact IC card 800.

(2) The IC card may be a noncontact IC card 800, as shown in FIGS. 19 and 20, that performs transmission and reception of information with the register apparatus using radio waves.

Here, the noncontact IC card 800 is, for example, loaded in the mobile telephone, and thereby electrically connected to the mobile telephone. The noncontact IC card 800 performs reception and transmission of information with the mobile telephone via this electrical connection.

As shown in FIG. 19, the noncontact IC card 800 is formed with an IC chip unit 801 and an antenna unit 802 sealed inside a resin board that is 32 mm in length, 24 mm in width, and 2.1 mm in thickness.

A connection unit 833 composed of a plurality of connection pins 811, 812, 813, 814, and so on is provided on a surface 800a of the noncontact IC card 800. The connection pins 811, 812, 813, 814, and soon are electrically connected to the IC chip unit 801, and the antenna unit 802 is also electrically connected to the IC chip unit 801.

Note that a method used to form a noncontact IC card is described in Japanese Laid-Open Patent Application No. 8-276458, and is therefore not described here.

The noncontact IC card 800 performs wireless communication over radio waves using a frequency band of 2.45 GHz. The noncontact IC card 800 is able to communicate at a distance of up to approximately one meter, and at a speed of 10 to 20 millisecond/byte.

The IC chip unit 801, as shown in FIG. 20, is composed of a communication unit 111, an authentication unit 112, a control unit 113, a discount calculation unit 114, an information storage unit 115, a wireless communication unit 831, and a power unit 832.

The communication unit 111, the authentication unit 112, the control unit 113, the discount calculation unit 114, the information storage unit 115 are the same is in the IC card 100 shown in FIG. 3, and therefore a description is omitted here.

<Communication Unit 111>

When the noncontact IC card 800 is loaded in the mobile telephone 500, the communication unit 111 is electrically connected to the mobile telephone 500 via the connection unit 833.

The communication unit 111 performs transmission and reception of information between the authentication unit 112 and the mobile telephone 500, between the control unit 113 and the mobile telephone 500, and between the discount calculation unit 114 and the mobile telephone 500.

<Power Unit 832>

The power unit 832 is connected to the antenna unit 802, and receives an electrical signal from the antenna unit 802 and accumulates the received electrical signal as electric charge. Furthermore, the when performing wireless communication, the power unit 832 supplies power to the components of the noncontact IC card 800.

This enables power the components of the noncontact IC card 800 to be supplied with power and to operate even when the noncontact IC card 800 is not loaded in the mobile telephone 500.

<Wireless Communication Unit 831>

The wireless communication unit 831 is composed of a modulation unit and a demodulation unit (not illustrated), and performs transmission and communication of information between the authentication unit 112 and the register apparatus 200, between the control unit 113 and the register apparatus 200, and between the discount calculation unit 114 and the register apparatus 200.

The modulation and demodulation units receive an electrical signal from the antenna unit 802, select, from among the received electrical signal, a signal having a frequency of 2.45 GHz, extract a pulse signal wave from the selected signal, and output the extracted pulse signal wave to as information.

Furthermore, the modulation unit switches the impedance of the antenna unit 802, according to the bits (either "0" or "1") in a bit string that makes up information received from the control unit 113, the authentication unit 112, or the discount calculation unit 114. Specifically, when each of the bits is "1", the antenna unit 802 switches the impedance to a first value, and when each of the bits is "0", the antenna unit 802 switches the impedance to a second value. This enables the amplitude and phase of the radio wave re-emitted by the antenna unit 802 to be changed, and this change enables information to be transmitted.

<Antenna Unit 201>

The antenna unit 201 is a reception antenna that receives radio waves, converts the received radio waves to an electrical signal, and outputs the electrical signal to the wireless communication unit 831 and the power unit 832. In addition, the antenna unit 201 reflects (re-emits) received radio waves.

<Register Apparatus 200a>

The register apparatus 200a is identical in structure to the register apparatus 200, except for having a wireless communication unit instead of the communication unit 218. The wireless communication unit performs wireless communication between with the noncontact IC card 800 over radio waves using a frequency band of 2.45 GHz.

Figure 21:
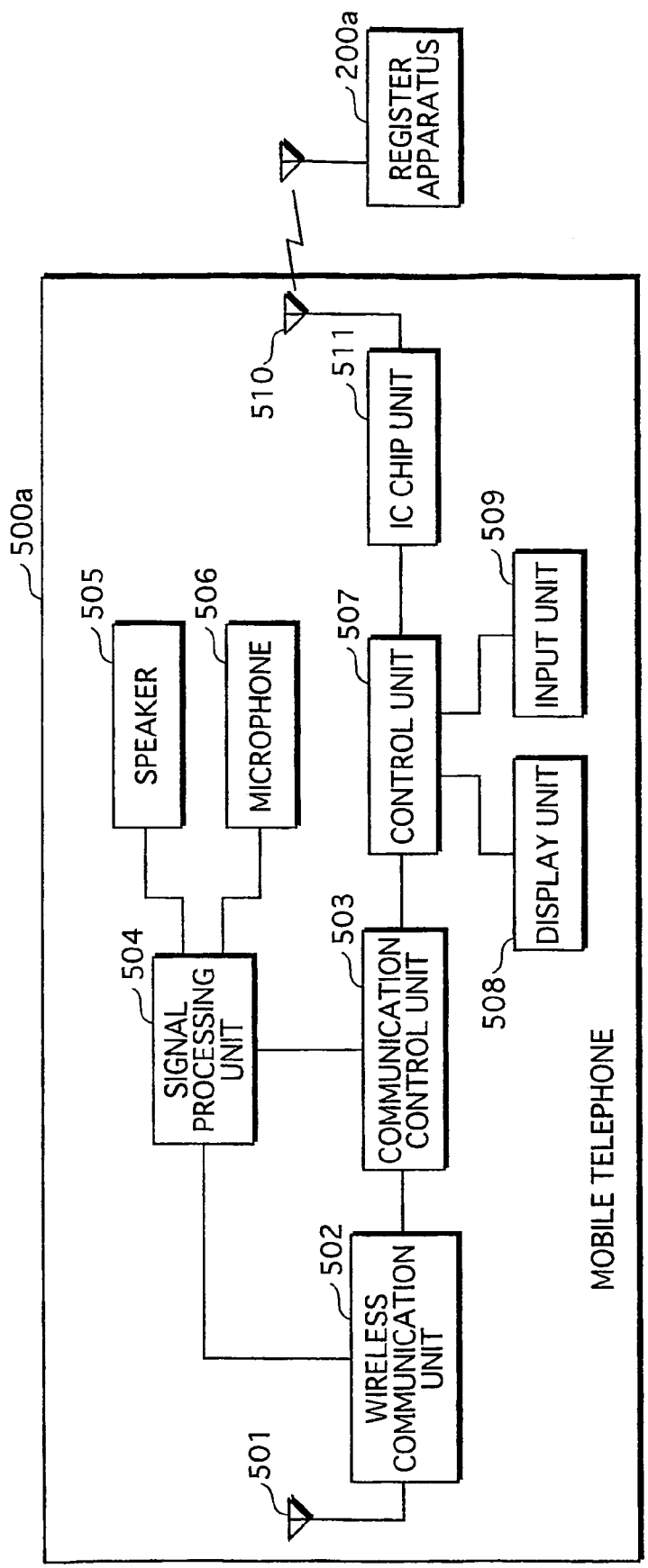

(3) A mobile telephone 500a shown in FIG. 21 may be used instead of the mobile telephone 500. The mobile telephone 500a includes an IC chip unit 511 and an antenna unit 510 that are the same as the IC chip unit 801 and the antenna unit 802 in the noncontact IC card 800. Here, the noncontact IC card 800 is detachable from the mobile telephone 500, whereas the IC chip unit 511 and the antenna unit 510 are provided as part of the mobile telephone 500a. The IC chip unit 511 and the antenna unit 510 perform wireless communication with the register apparatus 200a.

Figure 22:
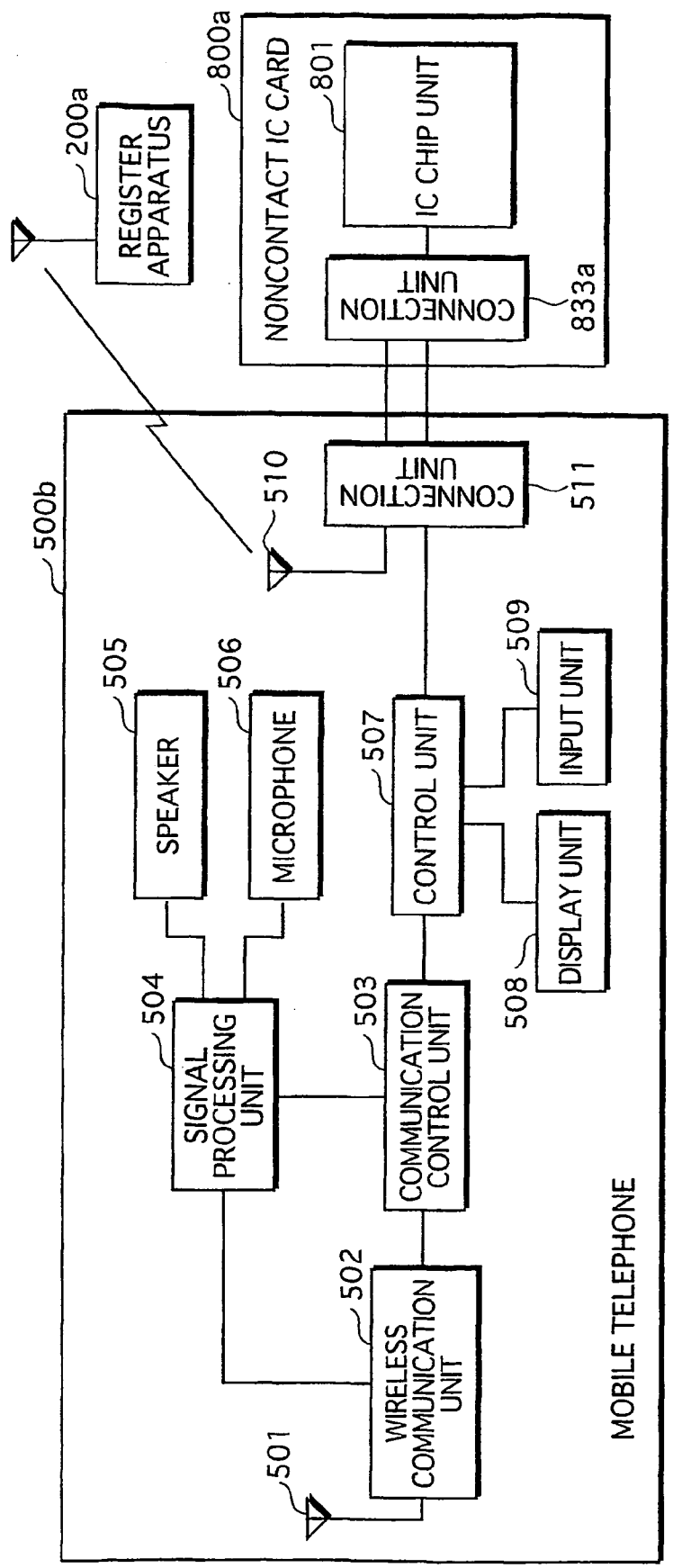

Furthermore, a mobile telephone 500b shown in FIG. 22 may be used instead of the mobile telephone 500. The mobile telephone 500b has an antenna unit 510 similar to the antenna unit 802 of the noncontact IC card 800, and a connection unit 511. In addition, a noncontact IC card 800a may be used instead of the noncontact IC card 800. The noncontact IC card 800a is not provided with the antenna unit 802, and has a connection unit 833a instead of the connection unit 833. When the noncontact IC card 800a is connected to the mobile telephone 500b, the IC chip unit 801 is electrically connected to the antenna unit 510 in the mobile telephone 500b, via the connection unit 833a and the connection unit 511. The noncontact IC card 800a performs wireless communication with the register apparatus 200a via the antenna unit 510.

Furthermore, a SIM card (subscriber identify module card/handykarte) may be loaded in the mobile telephone 500. SIM card is a generic name for an IC card that is inserted in a mobile telephone or a PDA, and enables personal information of the user to be confirmed and used. Furthermore, a UIM card is an IC card that is upwardly compatible with a SIM card. Since a SIM card or a UIM card has recorded thereon information such a mobile telephone number and a telephone directory, the user is able to use different mobile telephones by simply changing the SIM card or the UIM card. For example, the user needs only to switch the SIM card or the UIM card to replace his or her current mobile telephone with the latest mobile telephone. Here, the SIM card or UIM card has the same structure as the IC chip unit 511, and an information storage unit 115 in the IC chip unit 511 further stores the mobile telephone number and telephone directory.

Furthermore, the mobile telephone may perform transmission and reception of information with the register apparatus by infrared communication. In this way, the IC card performs transmission and reception of information with the register apparatus via the mobile telephone by infrared communication.

Furthermore, a mobile information terminal apparatus that includes a wireless communication function may be used instead of the mobile telephone in the described embodiment.

(4) The register apparatus may store in advance discount reference information about a condition for discounting a commodity, the rate of discount, and so on, and when the user makes a purchase, the register apparatus may calculate the discount amount.

(5) The control unit 113 of the IC card 100 may perform the following operations independently, in other words regardless of whether or not the IC card 100 is mounted in an other apparatus.

1) The control unit 113 reads one piece of discount reference information stored in the receipt area 131, and extracts the commodity ID from the read discount reference information.

2) The control unit 113 reads all pieces of receipt information that include the extracted commodity ID, from the receipt area 1312.

3) The control unit 113 judges, with use of the read receipt information, whether the discount condition included in the read discount reference information is fulfilled. Here, the control unit 113 judges in the manner as the discount calculation unit 114.

Here, when the IC card 100 operates independently, the IC card 100 does not have pre-receipt information since such pre-receipt information has not yet been received. Consequently, when the discount condition is, for example, that the commodity is discounted if the total number of commodities purchased in the past exceeds 100, in other words, when the discount condition does not include a condition about commodities to be purchased in the future, the control unit 113 can judge using only the read receipt information. Here, the control unit 113 writes the commodity ID to the information storage unit 115 as a prospective commodity ID.

Furthermore, if the discount condition is, for example, that if the total number of commodities purchased in the past and of the present purchase exceeds 100, a discount on the total number of commodities (i.e., the total number of commodities purchased in the past and in the present purchase) is applied to the present purchase, in other words, if the discount condition includes a condition that relates to both past and future purchases of commodities, the judgment cannot be performed with only the read receipt information. In this case, the control unit 113 calculates a prospective number of units that indicates how many units of the commodity must be purchased to fulfill the condition, and stores the calculated prospective number of units, and a prospective commodity ID showing the commodity ID of the commodity, to the information storage unit 115.

4) When the IC card 100 is connected to the mobile telephone 500, the control unit 113 reads the prospective commodity ID, or the prospective number of units and the prospective commodity ID, from the information storage unit 115, and outputs the read prospective commodity ID, or prospective number of units and prospective commodity ID, to the mobile telephone 500 via the communication unit 111.

5) The mobile telephone 500 receives the prospective commodity ID, or the prospective number of units and the prospective commodity ID, from the IC card 100, and displays the received prospective commodity ID, or prospective number of units and prospective commodity ID.

In this way, the user is able to find out what commodities to purchase in the future.

(6) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM (compact disk-read only memory), and MO (magneto-optical), a DVD-ROM (digital versatile disk-read only memory), a DVD-RAM (digital versatile disk-random access memory), a BD (BluRay Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(7) The present invention may be any combination of the above-described embodiment and modifications.

3. Effects of the Invention

As described, the present invention is a sales system including a recording medium used in purchasing a commodity, and a register apparatus that performs processing for settlement of payment for purchase of the commodity, wherein the recording medium includes: a storage unit operable to store condition information that indicates a condition to be fulfilled in order for a discount to be applied to a regular selling price of the commodity, and calculation method information indicating a method for calculating a discount amount; a judgment unit operable to judge, when the commodity is being purchased, whether the discount is to be applied, based on the condition information; a calculation unit operable to calculate, when the judgment unit judges that the discount is to be applied, the discount amount, based on the calculation method information; and an output unit operable to output the calculated discount amount, and the register apparatus includes: a reception unit operable to receive the discount amount; a calculation unit operable to calculate a discounted selling price of the commodity by subtracting the discount amount from the regular selling price; and a payment processing unit operable to perform settlement processing for payment for selling the commodity at the calculated discounted selling price.

According to the stated structure, at the time of purchase of a commodity, the recording medium calculates the discount amount for the commodity, and outputs the commodity amount to the register apparatus, and the register apparatus settles the sale according to the received discount amount. Therefore, the user is able to directly enjoy the advantages of the incentives provided by the recording medium.

Here, the sales system may further include a server apparatus that is located in a shop, and that manages commodity sales information relating to sales of commodities, wherein the register apparatus outputs commodity sales information to the server, the commodity sales information including the regular selling price of the commodity that has been sold, the discount amount, and the discounted selling price, and the server apparatus receives the commodity sales information, and internally stores the received commodity sales information. The recording medium may further store thereon bearer information in correspondence with the condition information and the calculation method information, and output the bearer information in correspondence with the calculated discount amount, the bearer information indicating a bearer who bears the discount amount that is discounted from the regular selling price. The register apparatus may further receive the bearer information, and output the commodity sales information in which the bearer information is further included, to the server apparatus. The server apparatus may further store therein shop server management information that indicates a manager of the server apparatus, and (i) receive the commodity sales information that includes the bearer information, and stores the commodity sales information, (ii) judge whether the bearer information included in the commodity sales information matches the stored sales server manager information, and (iii) when the commodity sales information is judged not match the stored sales server manager information, transmit the commodity sales information to an external server managed by the bearer indicated by the bearer information and deletes the internally stored commodity sales information. The sales system may further include a server apparatus provided in an external location to the shop, wherein the server apparatus provided in the external location is the external server, and stores therein external manager information that indicates a manager of the external server and that matches the bearer information, and receives the commodity sales information from the shop server and internally stores the received commodity sales information.

According to the stated structures, commodity selling information that includes a discount amount can be transmitted to the bearer of the discount on the commodity. Therefore, when the seller of the commodity and the bearer of the discount differ, settlement can be performed between the two parties.

Furthermore, the present invention is a recording medium used in purchasing a commodity, including: a storage unit operable to store condition information that indicates a condition to be fulfilled in order for a discount to be applied to a regular selling price of the commodity, and calculation method information indicating a method for calculating a discount amount; a judgment unit operable to judge, when the commodity is being purchased, whether the discount is to be applied, based on the condition information; a calculation unit operable to calculate, when the judgment unit judges that the discount is to be applied, the discount amount, based on the calculation method information; and an output unit operable to output the calculated discount amount. Here, the storage unit may further store, in advance, receipt information relating to a commodity previously purchased, the condition information may indicate that the regular selling price of the commodity is to be discounted based on a commodity previously purchased, and the judgment unit may judge whether the discount is to be applied, with use of the stored receipt information.

According to the stated structures, receipt information relating to a past purchase of a commodity can be used to judge whether a discount is to be applied. Therefore the user able to enjoy advantages of incentives that accompany use of the recording medium.

INDUSTRIAL APPLICABILITY

The described sales system can be used advantageously for business purposes, and repeatedly and continuously, by a retailer that sells commodities or provides services. Furthermore, each of the apparatuses in the sales system may be manufactured and sold by an electrical device manufacturer that manufactures and sells computers, electrical devices and the like.

The invention claimed is:

1. A sales system comprising:
   a recording medium for use in purchasing a commodity; a register apparatus for performing processing for settlement of payment for purchase of the commodity; and a server apparatus for managing commodity sales information relating to sales of commodities, the server apparatus being located in a shop,
   wherein the recording medium includes:
      a reception unit configured to receive pre-receipt information indicating a regular selling price of the commodity, and commodity information;
      a storage unit configured to store condition information that indicates a condition to be fulfilled in order for a discount to be applied to the regular selling price of the commodity, and calculation method information indicating a method for calculating a discount amount;
      a judgment unit configured to judge, when the commodity is being purchased, whether the discount is to be applied, based on the condition information;
      a calculation unit configured to calculate, when the judgment unit judges that the discount is to be applied, the discount amount, based on the calculation method information and the pre-receipt information; and
      an output unit configured to output the discount amount,
   wherein the register apparatus includes:
      a generation unit configured to generate the pre-receipt information, the pre-receipt information being generated before the judgment unit of the recording medium judges that the discount is to be applied;
      a reception unit configured to receive the discount amount;
      a calculation unit configured to calculate a discounted selling price of the commodity by subtracting the discount amount from the regular selling price; and
      a payment processing unit configured to perform settlement processing for payment for selling the commodity at the discounted selling price,
   wherein the recording medium stores thereon bearer information in correspondence with the condition information and the calculation method information, and is configured to output the bearer information in correspondence with the calculated discount amount, the bearer information indicating a bearer who bears the discount amount that is discounted form the regular selling price,
   wherein the register apparatus is configured to receive the bearer information, and output the commodity sales information in which the bearer information is included, to the server apparatus, and
   wherein the server apparatus stores therein shop server management information that indicates a manager of the server apparatus, and is configured to (i) receive the commodity sales information that includes the bearer information, and stores the commodity sales information, (ii) judged whether the bearer information included in the commodity sales information matches the stored sales server manager information, and (iii) when the commodity sales information is judged to not match the stored sales server manager information, transmit the commodity sales information to an external server managed by the bearer indicated by the bearer information and delete the stored commodity sales information.

2. The sales system of claim 1,
wherein the commodity sales information includes the regular selling price of the commodity that has been sold, the discount amount, and the discounted selling price, and
wherein the server apparatus is further configured to internally store the received commodity sales information.

3. The sales system of claim 1, further comprising a server apparatus provided in an external location to the shop,
wherein the server apparatus provided in the external location is the external server, and stores therein external manager information that indicates a manager of the external server and that matches the bearer information, and is configured to receive the commodity sales information from the server apparatus located in the shop, and internally store the received commodity sales information.

4. The sales system of claim 1, wherein
the judgment made by the judgment unit of the recording medium and the calculation made by the calculation unit of the recording medium are solely made by the recording medium.

5. A sales system comprising a mobile information terminal for use in purchasing a commodity; a register apparatus for performing processing for settlement of payment for purchase of the commodity; and a server apparatus for managing commodity sales information relating to sales of commodities, the server apparatus being located in a shop,
wherein the mobile information terminal includes:
a reception unit configured to receive pre-receipt information indicating a regular selling price of the commodity, and commodity information;
a storage unit configured to store condition information that indicates a condition to be fulfilled in order for a discount to be applied to the regular selling price of the commodity, and calculation method information indicating a method for calculating a discount amount;
a judgment unit configured to judge, when the commodity is being purchased, whether the discount is to be applied, based on the condition information;
a calculation unit configured to calculate, when the judgment unit judges that the discount is to be applied, the discount amount, based on the calculation method information and the pre-receipt information; and
an output unit configured to output the discount amount,
wherein the register apparatus includes:
a generation unit configured to generate the pre-receipt information, the pre-receipt information being generated before the judgment unit of the mobile information terminal judges that the discount is to be applied;
a reception unit configured to receive the discount amount;
a calculation unit configured to calculate a discounted selling price of the commodity by subtracting the discount amount from the regular selling price; and
a payment processing unit configured to perform settlement processing for payment for selling the commodity at the discounted selling price,
wherein the mobile information terminal stores thereon bearer information in correspondence with the condition information and the calculation method information, and is configured to output the bearer information in correspondence with the calculated discount amount, the bearer information indicating a bearer who bears the discount amount that is discounted from the regular selling price,
wherein the register apparatus is configured to receive the bearer information, and output the commodity sales information in which the bearer information is included, to the server apparatus, and
wherein the server apparatus stores therein shop server management information that indicates a manager of the server apparatus, and is configured to (i) receive the commodity sales information that includes the bearer information, and stores the commodity sales information, (ii) judge whether the bearer information included in the commodity sales information matches the stored sales server manager information, and (iii) when the commodity sales information is judged to not match the stored sales server manager information, transmit the commodity sales information to an external server managed by the bearer indicated by the bearer information and delete the internally stored commodity sales information.

6. The sales system of claim 5, wherein
the judgment made by the judgment unit of the mobile information terminal and the calculation made by the calculation unit of the mobile information terminal are solely made by the mobile information terminal.

* * * * *